United States Patent
Bryant et al.

(10) Patent No.: US 10,266,253 B1
(45) Date of Patent: Apr. 23, 2019

(54) METHODS AND APPARATUS FOR CONTROLLING LANDING GEAR SHRINK

(71) Applicant: The Boeing Company, Chicago, IL (US)

(72) Inventors: Malcolm S. Bryant, Maple Valley, WA (US); Leo W. Plude, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/809,397

(22) Filed: Nov. 10, 2017

(51) Int. Cl.
  *B64C 25/00* (2006.01)
  *B64C 25/22* (2006.01)
  *B64C 25/26* (2006.01)
  *B64C 25/34* (2006.01)

(52) U.S. Cl.
  CPC .......... *B64C 25/22* (2013.01); *B64C 25/001* (2013.01); *B64C 25/26* (2013.01); *B64C 25/34* (2013.01); *B64C 2025/008* (2013.01)

(58) Field of Classification Search
  CPC ....... B64C 25/22; B64C 25/001; B64C 25/26; B64C 25/34; B64C 2025/008
  USPC .......................................... 701/3, 13, 14, 16
  See application file for complete search history.

(56) References Cited

U.S. PATENT DOCUMENTS

| | | | |
|---|---|---|---|
| 5,908,174 A | 6/1999 | Churchill et al. | |
| 8,070,095 B2 | 12/2011 | Luce et al. | |
| 8,556,209 B2 | 10/2013 | Luce | |
| 8,695,764 B2 | 4/2014 | Luce | |
| 8,727,273 B2 | 5/2014 | Luce | |
| 9,321,525 B2 | 4/2016 | Luce | |
| 9,481,453 B2 | 11/2016 | Luce | |
| 9,771,147 B2 * | 9/2017 | Luce | B64C 25/22 |
| 2010/0096499 A1 * | 4/2010 | Luce | B64C 25/14 244/102 SS |
| 2013/0325221 A1 * | 12/2013 | Shue | G05D 1/0653 701/16 |

* cited by examiner

*Primary Examiner* — Gertrude Arthur Jeanglaude
(74) *Attorney, Agent, or Firm* — Hanley, Flight & Zimmerman, LLC

(57) ABSTRACT

Methods and apparatus for controlling landing gear shrink are described. A controller is to determine an on-ground status of a left main landing gear. The controller is also to determine an on-ground status of a right main landing gear. The controller is also to generate a control signal to shrink the left main landing gear and the right main landing gear based on the on-ground status of the left main landing gear and the on-ground status of the right main landing gear.

20 Claims, 7 Drawing Sheets

US 10,266,253 B1

METHODS AND APPARATUS FOR CONTROLLING LANDING GEAR SHRINK

FIELD OF THE DISCLOSURE

This disclosure relates generally to landing gear for aircraft and, more particularly, to methods and apparatus for controlling landing gear shrink.

BACKGROUND

Aircraft (e.g., commercial aircraft) commonly include landing gear (e.g., left main landing gear, right main landing gear, etc.) that may be hydraulically actuated to move between a deployed position and a retracted position. For example, the landing gear of an aircraft may by hydraulically actuated to move from the deployed position to the retracted position subsequent to and/or in connection with a takeoff procedure of the aircraft, and from the retracted position back to the deployed position prior to and/or in connection with a landing procedure of the aircraft.

Hydraulic actuation of the landing gear typically occurs in response to a manual actuation (e.g., via a pilot of the aircraft) of a landing gear lever located in a cockpit of the aircraft. During takeoff, the manual actuation of the landing gear lever by the pilot of the aircraft occurs only after the pilot has first ascertained (e.g., physically determined) that the aircraft is airborne (e.g., that no landing gear of the aircraft is in contact with a ground surface). As a result of typical human and/or pilot response times, the time at which the manual actuation of the landing gear lever occurs may be delayed relative to the time at which the aircraft first becomes airborne. Such delays limit the aircraft payload in connection with obstacle-impeded takeoffs, as may occur in association with runways that are surrounded by trees, walls, and/or other vertically-projecting structures to be cleared by the aircraft during takeoff.

Some known aircraft implement landing gear that must be shrunk (e.g., reduced in length) prior to being moved from the deployed position to the retracted position. For example, the length of the landing gear may need to be reduced (e.g., shrunk) such that the landing gear is able to fit within the spatial confines of a well of the aircraft that stows the landing gear in the retracted position. In such known aircraft, the shrinking of the landing gear is may be performed by the same hydraulic system that moves the landing gear from the deployed position to the retracted position. The hydraulic system, however, typically does not have sufficient power to perform the shrinking and retraction processes in parallel. Thus, the hydraulic system must first perform the shrinking process, and then serially perform the retraction process. This two-stage serial process is initiated via the manual actuation of the landing gear lever by the pilot of the aircraft as described above.

SUMMARY

Methods and apparatus for controlling landing gear shrink are disclosed. In some examples, an apparatus is disclosed. In some disclosed examples, the apparatus comprises a controller. In some disclosed examples, the controller is to determine an on-ground status of a left main landing gear. In some disclosed examples, the controller is to determine an on-ground status of a right main landing gear. In some disclosed examples, the controller is to generate a control signal to shrink the left main landing gear and the right main landing gear based on the on-ground status of the left main landing gear and the on-ground status of the right main landing gear.

In some examples, a method is disclosed. In some disclosed examples, the method comprises determining, by executing one or more instructions via a controller, an on-ground status of a left main landing gear. In some disclosed examples, the method comprises determining, by executing one or more instructions via the controller, an on-ground status of a right main landing gear. In some disclosed examples, the method comprises generating, by executing one or more instructions via the controller, a control signal to shrink the left main landing gear and the right main landing gear based on the on-ground status of the left main landing gear and the on-ground status of the right main landing gear.

In some examples, a non-transitory machine-readable storage medium comprising instructions is disclosed. In some disclosed examples, the instructions, when executed, cause a controller to determine an on-ground status of a left main landing gear. In some disclosed examples, the instructions, when executed, cause the controller to determine an on-ground status of a right main landing gear. In some disclosed examples, the instructions, when executed, cause the controller to generate a control signal to shrink the left main landing gear and the right main landing gear based on the on-ground status of the left main landing gear and the on-ground status of the right main landing gear.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Figure 1:
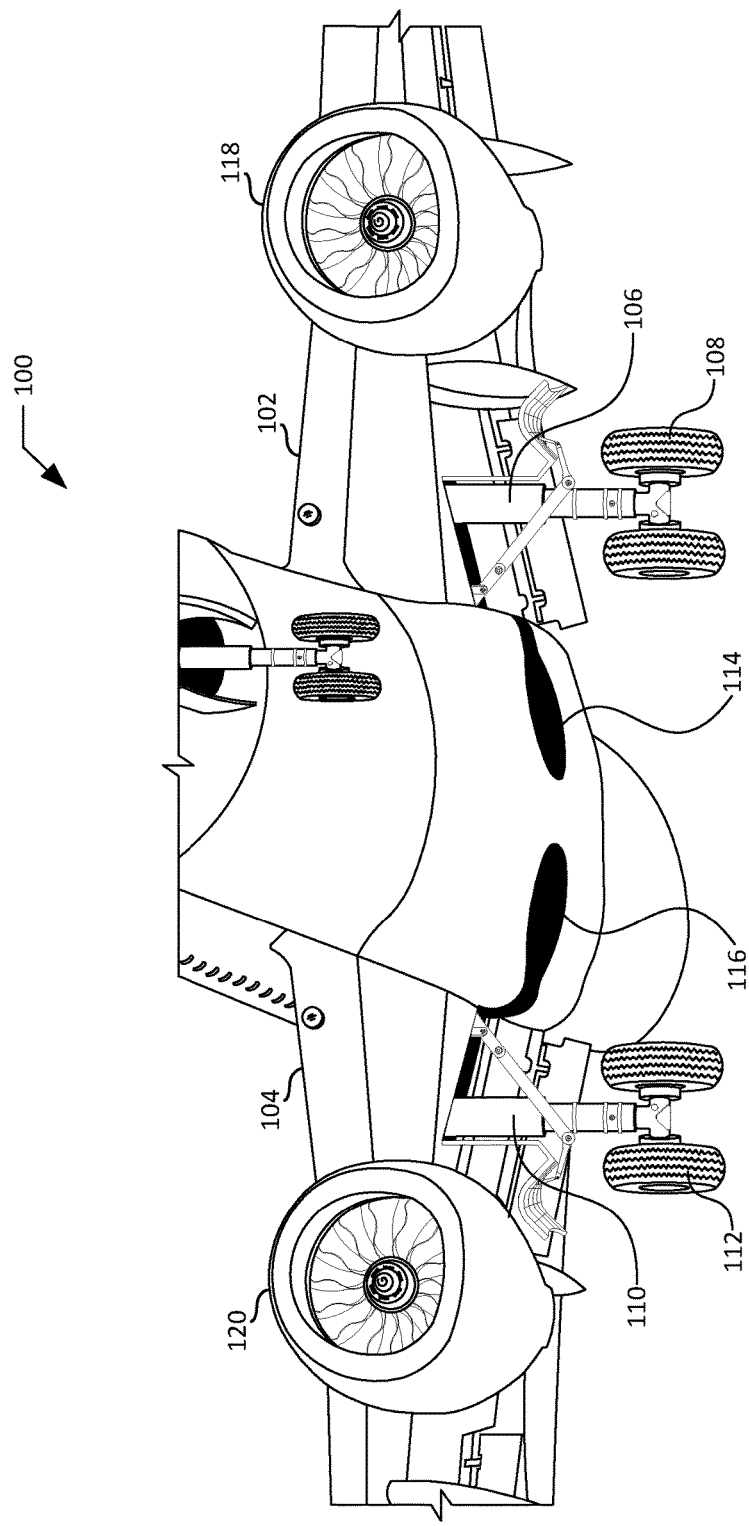
FIG. 1 illustrates an example aircraft in which an example shrink control system may be implemented in accordance with the teachings of this disclosure.

FIG. 1 illustrates an example aircraft 100 in which an example shrink control system may be implemented in accordance with the teachings of this disclosure. The aircraft 100 includes an example left wing 102 and an example right wing 104. The aircraft 100 also includes an example left main landing gear (LMLG) 106 coupled to the left wing 102 and having a first example set of wheels 108, and an example right main landing gear (RMLG) 110 coupled to the right wing 104 and having a second example set of wheels 112.

In the illustrated example of FIG. 1, the LMLG 106 and the RMLG 110 are in a deployed (e.g., downlocked) position. The LMLG 106 is movable from the deployed position shown in FIG. 1 to a retracted position in which the LMLG 106 and/or the first set of wheels 108 is/are positioned in a first example well 114 of the aircraft 100 of FIG. 1. The RMLG 110 is also movable from the deployed position shown in FIG. 1 to a retracted position in which the RMLG 110 and/or the second set of wheels 112 is/are positioned in a second example well 116 of the aircraft 100 of FIG. 1. Downlock members (e.g., downlock struts, rods, shafts, and/or links) that are respectively coupled to corresponding ones of the LMLG 106 and the RMLG 110 of FIG. 1 may be positioned and/or engaged to secure and/or lock the LMLG 106 and the RMLG 110 in the deployed position, and may be repositioned and/or disengaged to enable the LMLG 106 and the RMLG 110 to be moved from the deployed position to the retracted position.

Movement of the LMLG 106 and the RMLG 110 between the deployed and retracted positions occurs via a landing gear hydraulic actuation system located within the aircraft 100 of FIG. 1. The landing gear hydraulic actuation system is operatively coupled to a controller located within the aircraft 100 of FIG. 1. The controller manages and/or controls the operation of the landing gear hydraulic actuation system.

In some examples, a landing gear lever (LGL) located within the aircraft 100 of FIG. 1 (e.g., in a cockpit of the aircraft 100) is operatively coupled to the controller. Movement of the landing gear lever (e.g., via a pilot) between a down position and an up position generates corresponding positional inputs to be received by the controller to facilitate movement of the LMLG 106 and the RMLG 110 between the deployed and retracted positions described above. The landing gear lever may be moved from the down position to the up position subsequent to and/or in connection with a takeoff procedure of the aircraft 100 of FIG. 1. The landing gear lever may be moved from the up position to the down position prior to and/or in connection with a landing procedure of the aircraft 100 of FIG. 1. In some examples, operation of the shrink control systems disclosed herein may be based in part on the position of the landing gear lever.

In other examples (e.g., in examples where the aircraft 100 of FIG. 1 is an unmanned and/or autonomous aircraft), a landing gear position manager (e.g., a programmable processor) located within the aircraft 100 of FIG. 1 is operatively coupled to the controller. The landing gear position manager may be remotely programmed, commanded, set, and/or controlled to obtain, take on, and/or achieve a first state corresponding to a down position or a second state corresponding to an up position to generate corresponding positional inputs to be received by the controller to facilitate movement of the LMLG 106 and the RMLG 110 between the deployed and retracted positions described above. The landing gear position manager may be remotely programmed, commanded, and/or set to the first state corresponding to the up position subsequent to and/or in connection with a takeoff procedure of the aircraft 100 of FIG. 1. The landing gear position manager may be remotely programmed, commanded, and/or set to the second state corresponding to the down position prior to and/or in connection with a landing procedure of the aircraft 100 of FIG. 1. In some examples, operation of the shrink control systems disclosed herein may be based in part on the state and/or the corresponding position of the landing gear position manager.

Respective ones of the LMLG 106 and the RMLG 110 have a first length (e.g., an unshrunk length) when positioned in the deployed (e.g., downlocked) position shown in FIG. 1. For example, the first length of the LMLG 106 may be measured from the underside of the left wing 102 of the aircraft 100 to the bottom of the first set of wheels 108 when the LMLG 106 is positioned in the deployed position shown in FIG. 1, and the first length of the RMLG 110 may be measured from the underside of the right wing 104 of the aircraft 100 to the bottom of the second set of wheels 112 when the RMLG 110 is positioned in the deployed position shown in FIG. 1. In some disclosed examples, the first length (e.g., the unshrunk length) of the LMLG 106 and/or the RMLG 110 may exceed spatial limitations defined by the shape and/or volume of corresponding ones of the first well 114 and/or the second well 116 of the aircraft 100 of FIG. 1. In such examples, it becomes necessary to shrink (e.g., to reduce the length of) the LMLG 106 and/or the RMLG 110 from the first length to a second length (e.g., a shrunk length) that is less than the first length, and which enables the LMLG 106 and/or the RMLG 110 to fit within the spatial limitations defined by the shape and/or volume of the corresponding ones of the first well 114 and/or the second well 116 of the aircraft 100 of FIG. 1.

Shrinking and/or unshrinking of the LMLG 106 and/or the RMLG 110 of FIG. 1 occurs via the above-described landing gear hydraulic actuation system of the aircraft 100 of FIG. 1 and the example shrink control systems disclosed herein. The LMLG 106 and/or the RMLG 110 of FIG. 1 may be shrunk (e.g. reduced in length) from the first length to the second length prior to and/or in connection with moving the LMLG 106 and/or the RMLG 110 from the deployed position to the retracted position, and may be unshrunk (e.g., increased in length) from the second length to the first length subsequent to and/or in connection with moving the LMLG 106 and/or the RMLG 110 from the retracted position to the deployed position. In some examples, the difference between the first length (e.g., the unshrunk length) and the second length (e.g., the shrunk length) of respective ones of the LMLG 106 and the RMLG 110 of FIG. 1 may be approximately nine inches. In other examples, the difference between the first length and the second length may be greater than or less than nine inches (e.g., six inches, twelve inches, etc.).

Figure 2:
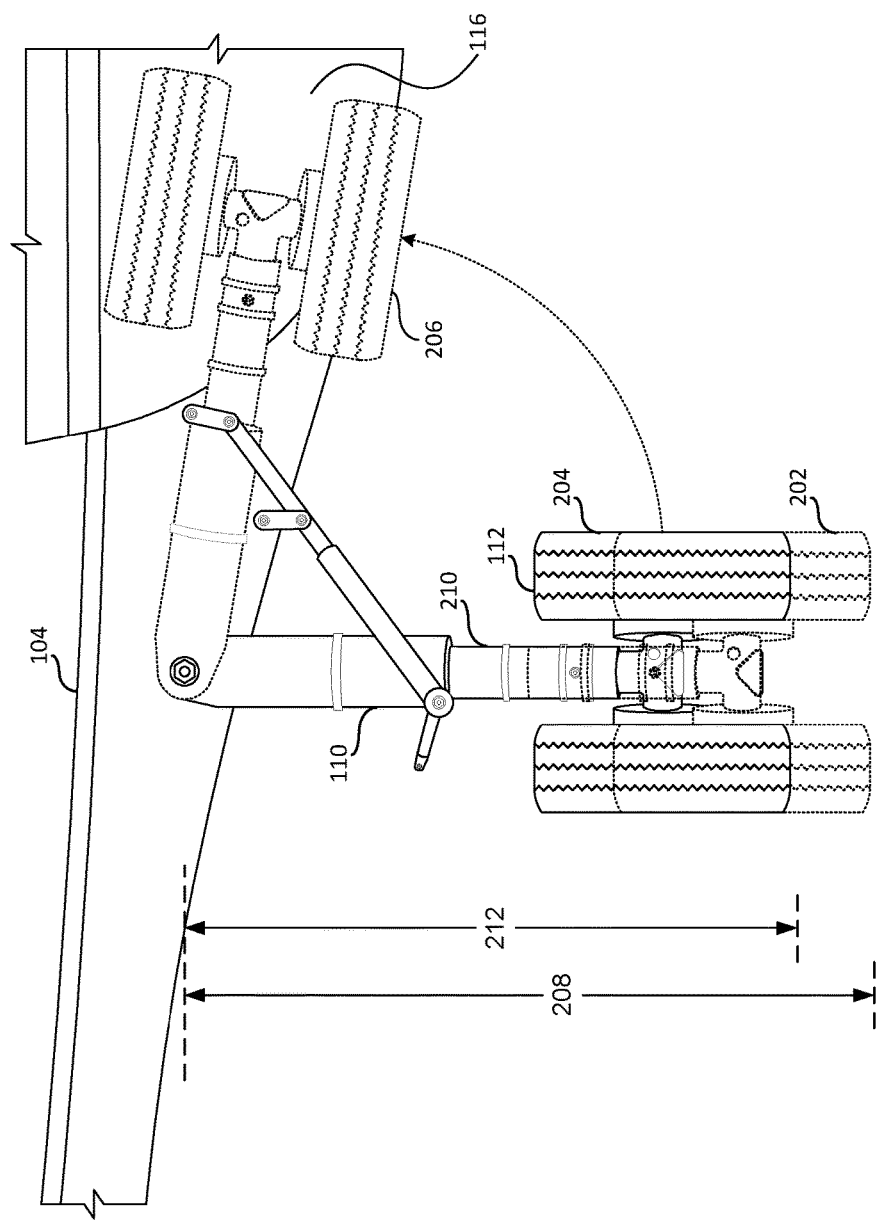
FIG. 2 illustrates the example RMLG of FIG. 1 in an example unshrunk deployed position, in an example shrunk deployed position, and in an example shrunk retracted position.

FIG. 2 illustrates the example RMLG 110 of FIG. 1 in an example unshrunk deployed position 202, in an example shrunk deployed position 204, and in an example shrunk retracted position 206. The RMLG 110 of FIGS. 1 and 2 may be positioned in the unshrunk deployed position 202 of FIG. 2 (shown in phantom) when the second set of wheels 112 of the RMLG 110 of FIGS. 1 and 2 is not in contact with a ground surface (e.g., when the aircraft 100 of FIG. 1 is airborne). The RMLG 110 of FIGS. 1 and 2 has an example first length 208 measured from the underside of the right wing 104 of FIGS. 1 and 2 to the bottom of the second set of wheels 112 of FIGS. 1 and 2 when the RMLG 110 is in the unshrunk deployed position 202 shown in FIG. 2. The first length 208 of FIG. 2 may be associated with an example oleo strut 210 of the RMLG 110 of FIGS. 1 and 2 being uncompressed and/or extended in response to the weight of the aircraft 100 being removed from the RMLG 110 subsequent to and/or in connection with takeoff of the aircraft 100. The first length 208 of FIG. 2 may also be associated with the oleo strut 210 of the RMLG 110 of FIGS. 1 and 2 being unshrunk (e.g., from the shrunk deployed position 204 of FIG. 2) in response to an unshrink command generated via the example shrink control systems disclosed herein.

The RMLG 110 of FIGS. 1 and 2 may be positioned in the shrunk deployed position 204 of FIG. 2 when the second set of wheels 112 of the RMLG 110 of FIGS. 1 and 2 are not in contact with a ground surface (e.g., when the aircraft 100 of FIG. 1 is airborne) and when the oleo strut 210 of the RMLG 110 has been shrunk. The RMLG 110 of FIGS. 1 and 2 has an example second length 212 measured from the underside of the right wing 104 of FIGS. 1 and 2 to the bottom of the second set of wheels 112 of FIGS. 1 and 2 when the RMLG 110 is in the shrunk deployed position 204 shown in FIG. 2. The second length 212 of FIG. 2 is less than the first length 208 of FIG. 2. In some examples, the second length 212 of FIG. 2 may be approximately nine inches less than the first length 208 of FIG. 2. In other examples, the difference between the first length 208 and the second length 212 of FIG. 2 may be greater than or less than nine inches (e.g., six inches, twelve inches, etc.). The second length 212 of FIG. 2 may be associated with the oleo strut 210 of the RMLG 110 of FIGS. 1 and 2 being shrunk in response to a shrink command generated via the example shrink control systems disclosed herein.

The RMLG 110 of FIGS. 1 and 2 may be positioned in the shrunk retracted position 206 of FIG. 2 (shown in phantom) subsequent to the oleo strut 210 of the RMLG 110 of FIGS. 1 and 2 being shrunk. The RMLG 110 of FIGS. 1 and 2 maintains the second length 212 of FIG. 2 described above when the RMLG 110 is in the shrunk retracted position 206 shown in FIG. 2, such that the RMLG 110 fits within the spatial limitations defined by the shape and/or volume of the second well 116 of FIGS. 1 and 2.

Returning to the illustrated example of FIG. 1, the aircraft 100 also includes an example left engine (LE) 118 and an example right engine (RE) 120. The speed at which the left engine 118 runs and/or operates is controlled based on inputs received from and/or provided by a left throttle lever (LTL) located within the aircraft 100 of FIG. 1 (e.g., in a cockpit of the aircraft 100). The speed at which the right engine 120 runs and/or operates is controlled based on positional inputs received from and/or provided by a right throttle lever (RTL) located within the aircraft 100 of FIG. 1 (e.g., in a cockpit of the aircraft 100). Movement of the left throttle lever and the right throttle lever (e.g., via a pilot) beyond a throttle lever position threshold (e.g., beyond fifty degrees) may occur prior to and/or in connection with a takeoff procedure of the aircraft 100 of FIG. 1. Respective ones of the left engine 118 and the right engine 120 may exceed an engine speed threshold speed prior to and/or in connection with the takeoff procedure. In some examples, operation of the shrink control systems disclosed herein may be based in part on the respective positions of the left throttle lever and the right throttle lever, and/or the respective speeds of the left engine 118 and the right engine 120.

In other examples (e.g., in examples where the aircraft 100 of FIG. 1 is an unmanned and/or autonomous aircraft), a left throttle position manager and a right throttle position manager (e.g., one or more programmable processor(s)) located within the aircraft 100 of FIG. 1 are operatively coupled to the controller. The left throttle position manager and the right throttle position manager may be remotely programmed, commanded, set, and/or controlled to obtain, take on, and/or achieve various states corresponding to various throttle positions to generate corresponding throttle positional inputs to be received by the controller. The left throttle position manager and the right throttle position manager may respectively be remotely programmed, commanded, and/or set to a state corresponding to a position beyond a throttle position threshold subsequent to and/or in connection with a takeoff procedure of the aircraft 100 of FIG. 1. In some examples, operation of the shrink control systems disclosed herein may be based in part on the respective states and/or the corresponding respective positions of the left throttle position manager and the right throttle position manager.

The example shrink control systems disclosed herein provide for automated control of the shrinking and/or unshrinking of the LMLG 106 and/or the RMLG 110 of the aircraft 100 of FIG. 1. Automating the shrinking and/or unshrinking of the LMLG 106 and/or the RMLG 110 simplifies the overall process of retracting and/or deploying the LMLG 106 and/or the RMLG 110, and advantageously reduces the amount of time that may otherwise be consumed conducting the entirety of the retraction and/or deployment processes. For example, in response to determining that certain takeoff criteria associated with the aircraft 100 of FIG. 1 have been satisfied, the disclosed shrink control systems may automatically shrink the LMLG 106 and the RMLG 110 of FIG. 1 at a time prior to the landing gear lever of the aircraft 100 of FIG. 1 being manually actuated into the up position. Based on such automated shrinking, aircraft implementing the disclosed shrink control systems may carry greater payload in connection with obstacle-impeded takeoffs, as may occur in association with runways that are surrounded by trees, walls, and/or other vertically-projecting structures to be cleared by the aircraft during takeoff.

Figure 3:
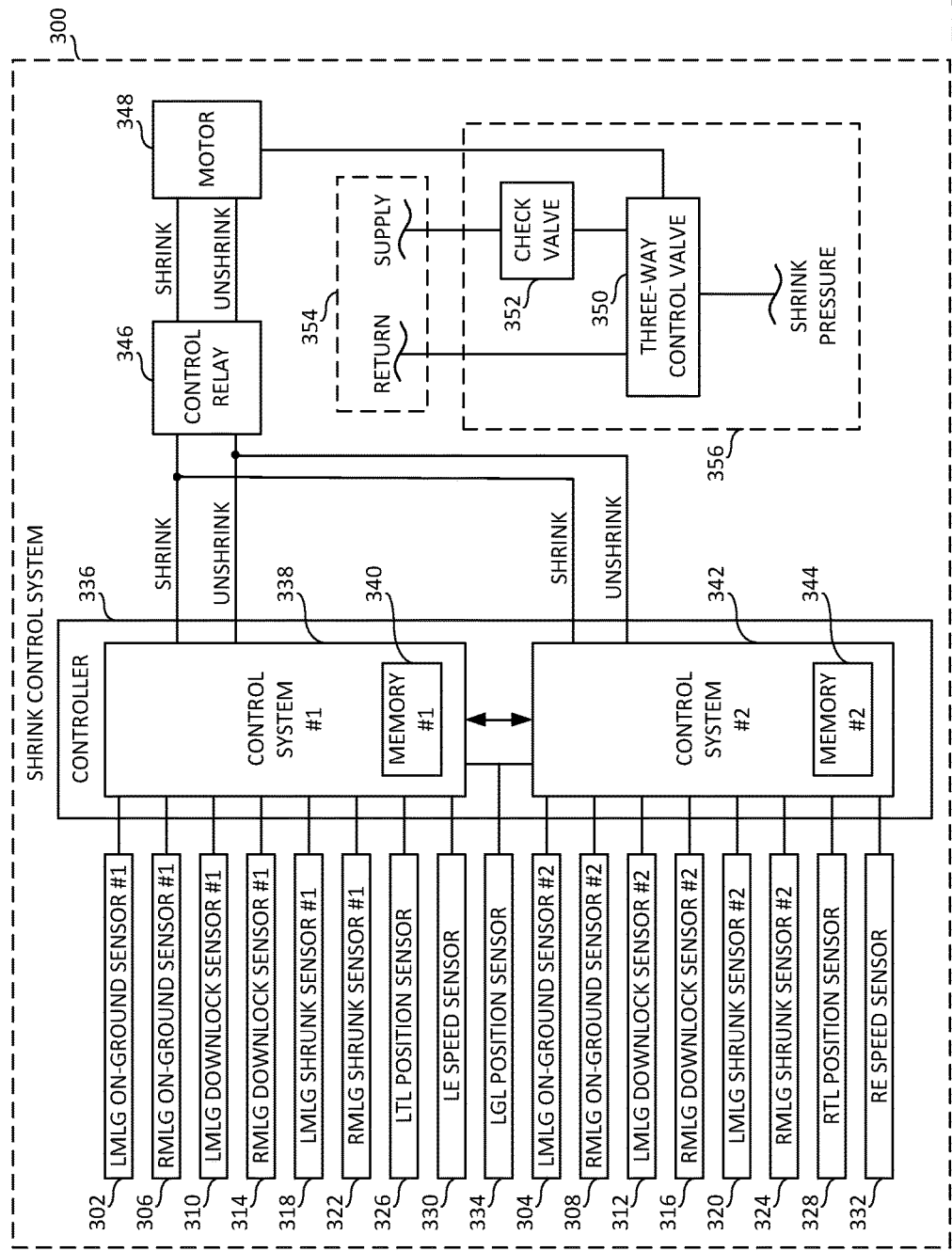
FIG. 3 is a block diagram of a first example shrink control system constructed in accordance with the teachings of this disclosure.

FIG. 3 is a block diagram of a first example shrink control system 300 constructed in accordance with the teachings of this disclosure. The shrink control system 300 of FIG. 3 includes a first example LMLG on-ground sensor 302, a second example LMLG on-ground sensor 304, a first example RMLG on-ground sensor 306, a second example RMLG on-ground sensor 308, a first example LMLG downlock sensor 310, a second example LMLG downlock sensor 312, a first example RMLG downlock sensor 314, a second example RMLG downlock sensor 316, a first example LMLG shrunk sensor 318, a second example LMLG shrunk sensor 320, a first example RMLG shrunk sensor 322, a second example RMLG shrunk sensor 324, an example LTL position sensor 326, an example RTL position sensor 328, an example LE speed sensor 330, an example RE speed sensor 332, an example LGL position sensor 334, an example controller 336, a first example control system 338, a first example memory 340, a second example control system 342, a second example memory 344, an example control relay 346, an example motor 348, an example three-way control valve 350, and an example check valve 352.

In the illustrated example of FIG. 3, respective ones of the first LMLG on-ground sensor 302, the first RMLG on-ground sensor 306, the first LMLG downlock sensor 310, the first RMLG downlock sensor 314, the first LMLG shrunk sensor 318, the first RMLG shrunk sensor 322, the LTL position sensor 326, the LE speed sensor 330, and the LGL position sensor 334 of FIG. 3 are operatively coupled to the first control system 338, and/or, more generally, to the controller 336 of FIG. 3. Respective ones of the second LMLG on-ground sensor 304, the second RMLG on-ground sensor 308, the second LMLG downlock sensor 312, the second RMLG downlock sensor 316, the second LMLG shrunk sensor 320, the second RMLG shrunk sensor 324, the RTL position sensor 328, the RE speed sensor 332, and the LGL position sensor 334 of FIG. 3 are operatively coupled to the second control system 342, and/or, more generally, to the controller 336 of FIG. 3. The first control system 338 of FIG. 3 is operatively coupled to the second control system 342 of FIG. 3. The control relay 346 of FIG. 3 is operatively coupled to the first control system 338 and the second control system 342, and/or, more generally, to the controller 336 of FIG. 3. The motor 348 of FIG. 3 is operatively coupled to the control relay 346 of FIG. 3. The three-way control valve 350 of FIG. 3 is operatively coupled to the motor 348 of FIG. 3. The check valve 352 of FIG. 3 is in fluid communication with the three-way control valve 350 of FIG. 3.

Each of the first LMLG on-ground sensor 302 and the second LMLG on-ground sensor 304 of FIG. 3 senses and/or detects whether the first set of wheels 108 of the LMLG 106 of FIG. 1 is in contact with a ground surface such as a runway (e.g., LMLG on-ground status data). For example, the first set of wheels 108 of FIG. 1 may be coupled to a structural member (e.g., a shock strut) of the LMLG 106 of FIG. 1 via a shock absorber that expands and/or elongates as the weight of the aircraft 100 of FIG. 1 is removed from the first set of wheels 108 in connection with the aircraft 100 leaving the ground (e.g., during takeoff). In such an example, the first set of wheels 108 may be spaced at a first distance from the structural member of the LMLG 106 when the first set of wheels 108 are in contact with a ground surface, and may be spaced at a second distance from the structural member of the LMLG 106 greater than the first distance when the first set of wheels 108 are not in contact with the ground surface. In such an example, the first LMLG on-ground sensor 302 and the second LMLG on-ground sensor 304 of FIG. 3 may be implemented as proximity sensors that sense and/or detect the position of the first set of wheels 108 of the LMLG 106 of FIG. 1 relative to the structural member of the LMLG 106.

The first LMLG on-ground sensor 302 of FIG. 3 is located, mounted on, and/or otherwise structurally coupled to the LMLG 106 of FIG. 1, and is operatively coupled to the first control system 338, the first memory 340, and/or, more generally, the controller 336 of FIG. 3. LMLG on-ground status data sensed and/or detected by the first LMLG on-ground sensor 302 of FIG. 3 may be stored in the first memory 340 of FIG. 3, and may be accessed by the first control system 338 and/or, more generally, by the controller 336 of FIG. 3 either from the first memory 340 of FIG. 3 or directly from the first LMLG on-ground sensor 302 of FIG. 3. In some examples, the first LMLG on-ground sensor 302 of FIG. 3 may constantly sense and/or constantly detect the LMLG on-ground status data. In other examples, the first LMLG on-ground sensor 302 of FIG. 3 may periodically sense and/or periodically detect the LMLG on-ground status data based on a timing interval and/or a sampling frequency implemented via the first control system 338 and/or the controller 336 of FIG. 3.

The second LMLG on-ground sensor 304 of FIG. 3 is also located, mounted on, and/or otherwise structurally coupled to the LMLG 106 of FIG. 1, but is operatively coupled to the second control system 342, the second memory 344, and/or, more generally, the controller 336 of FIG. 3. LMLG on-ground status data sensed and/or detected by the second LMLG on-ground sensor 304 of FIG. 3 may be stored in the second memory 344 of FIG. 3, and may be accessed by the second control system 342 and/or, more generally, by the controller 336 of FIG. 3 either from the second memory 344 of FIG. 3 or directly from the second LMLG on-ground sensor 304 of FIG. 3. In some examples, the second LMLG on-ground sensor 304 of FIG. 3 may constantly sense and/or constantly detect the LMLG on-ground status data. In other examples, the second LMLG on-ground sensor 304 of FIG. 3 may periodically sense and/or periodically detect the LMLG on-ground status data based on a timing interval and/or a sampling frequency implemented via the second control system 342 and/or the controller 336 of FIG. 3.

Each of the first RMLG on-ground sensor 306 and the second RMLG on-ground sensor 308 of FIG. 3 senses and/or detects whether the second set of wheels 112 of the RMLG 110 of FIG. 1 is in contact with a ground surface such as a runway (e.g., RMLG on-ground status data). For example, the second set of wheels 112 of FIG. 1 may be coupled to a structural member (e.g., a shock strut) of the RMLG 110 of FIG. 1 via a shock absorber that expands and/or elongates as the weight of the aircraft 100 of FIG. 1 is removed from the second set of wheels 112 in connection with the aircraft 100 leaving the ground (e.g., during takeoff). In such an example, the second set of wheels 112 may be spaced at a first distance from the structural member of the RMLG 110 when the second set of wheels 112 are in contact with a ground surface, and may be spaced at a second distance from the structural member of the RMLG 110 greater than the first distance when the second set of wheels 112 are not in contact with the ground surface. In such an example, the first RMLG on-ground sensor 306 and the second RMLG on-ground sensor 308 of FIG. 3 may be implemented as proximity sensors that sense and/or detect the position of the second set of wheels 112 of the RMLG 110 of FIG. 1 relative to the structural member of the RMLG 110.

The first RMLG on-ground sensor 306 of FIG. 3 is located, mounted on, and/or otherwise structurally coupled to the RMLG 110 of FIG. 1, and is operatively coupled to the first control system 338, the first memory 340, and/or, more generally, the controller 336 of FIG. 3. RMLG on-ground status data sensed and/or detected by the first RMLG on-ground sensor 306 of FIG. 3 may be stored in the first memory 340 of FIG. 3, and may be accessed by the first control system 338 and/or, more generally, by the controller 336 of FIG. 3 either from the first memory 340 of FIG. 3 or directly from the first RMLG on-ground sensor 306 of FIG. 3. In some examples, the first RMLG on-ground sensor 306 of FIG. 3 may constantly sense and/or constantly detect the RMLG on-ground status data. In other examples, the first RMLG on-ground sensor 306 of FIG. 3 may periodically sense and/or periodically detect the RMLG on-ground status data based on a timing interval and/or a sampling frequency implemented via the first control system 338 and/or the controller 336 of FIG. 3.

The second RMLG on-ground sensor 308 of FIG. 3 is also located, mounted on, and/or otherwise structurally coupled to the RMLG 110 of FIG. 1, but is operatively coupled to the second control system 342, the second memory 344, and/or, more generally, the controller 336 of FIG. 3. RMLG on-ground status data sensed and/or detected by the second RMLG on-ground sensor 308 of FIG. 3 may be stored in the second memory 344 of FIG. 3, and may be accessed by the second control system 342 and/or, more generally, by the controller 336 of FIG. 3 either from the second memory 344 of FIG. 3 or directly from the second RMLG on-ground sensor 308 of FIG. 3. In some examples, the second RMLG on-ground sensor 308 of FIG. 3 may constantly sense and/or constantly detect the RMLG on-ground status data. In other examples, the second RMLG on-ground sensor 308 of FIG. 3 may periodically sense and/or periodically detect the RMLG on-ground status data based on a timing interval and/or a sampling frequency implemented via the second control system 342 and/or the controller 336 of FIG. 3.

Each of the first LMLG downlock sensor 310 and the second LMLG downlock sensor 312 of FIG. 3 senses and/or detects whether the LMLG 106 of FIG. 1 is downlocked (e.g., LMLG downlock status data). For example, the LMLG 106 of FIG. 1 may include downlock members (e.g., downlock struts, rods, shafts, and/or links) that may be moved to, secured in, and/or locked in a downlocked position associated with the LMLG 106. In such an example, a first one of the downlock members may be spaced at a first distance from a second one of the downlock members and/or another structural member (e.g., a shock strut) of the LMLG 106 of FIG. 1 when the LMLG 106 is downlocked, and may be spaced at a second distance from the second one of the downlock members and/or the other structural member of the LMLG 106 when the LMLG 106 is not downlocked. In such an example, the first LMLG downlock sensor 310 and the second LMLG downlock sensor 312 of FIG. 3 may be implemented as proximity sensors that sense and/or detect the position of the first one of the downlock members of the LMLG 106 relative to the second one of the downlock members and/or the other structural member of the LMLG 106.

The first LMLG downlock sensor 310 of FIG. 3 is located, mounted on, and/or otherwise structurally coupled to the LMLG 106 of FIG. 1, and is operatively coupled to the first control system 338, the first memory 340, and/or, more generally, the controller 336 of FIG. 3. LMLG downlock status data sensed and/or detected by the first LMLG downlock sensor 310 of FIG. 3 may be stored in the first memory 340 of FIG. 3, and may be accessed by the first control system 338 and/or, more generally, by the controller 336 of FIG. 3 either from the first memory 340 of FIG. 3 or directly from the first LMLG downlock sensor 310 of FIG. 3. In some examples, the first LMLG downlock sensor 310 of FIG. 3 may constantly sense and/or constantly detect the LMLG downlock status data. In other examples, the first LMLG downlock sensor 310 of FIG. 3 may periodically sense and/or periodically detect the LMLG downlock status data based on a timing interval and/or a sampling frequency implemented via the first control system 338 and/or the controller 336 of FIG. 3.

The second LMLG downlock sensor 312 of FIG. 3 is also located, mounted on, and/or otherwise structurally coupled to the LMLG 106 of FIG. 1, but is operatively coupled to the second control system 342, the second memory 344, and/or, more generally, the controller 336 of FIG. 3. LMLG downlock status data sensed and/or detected by the second LMLG downlock sensor 312 of FIG. 3 may be stored in the second memory 344 of FIG. 3, and may be accessed by the second control system 342 and/or, more generally, by the controller 336 of FIG. 3 either from the second memory 344 of FIG. 3 or directly from the second LMLG downlock sensor 312 of FIG. 3. In some examples, the second LMLG downlock sensor 312 of FIG. 3 may constantly sense and/or constantly detect the LMLG downlock status data. In other examples, the second LMLG downlock sensor 312 of FIG. 3 may periodically sense and/or periodically detect the LMLG downlock status data based on a timing interval and/or a sampling frequency implemented via the second control system 342 and/or the controller 336 of FIG. 3.

Each of the first RMLG downlock sensor 314 and the second RMLG downlock sensor 316 of FIG. 3 senses and/or detects whether the RMLG 110 of FIG. 1 is downlocked (e.g., RMLG downlock status data). For example, the RMLG 110 of FIG. 1 may include downlock members (e.g., downlock struts, rods, shafts, and/or links) that may be moved to, secured in, and/or locked in a downlocked position associated with the RMLG 110. In such an example, a first one of the downlock members may be spaced at a first distance from a second one of the downlock members and/or another structural member (e.g., a shock strut) of the RMLG 110 of FIG. 1 when the RMLG 110 is downlocked, and may be spaced at a second distance from the second one of the downlock members and/or the other structural member of the RMLG 110 when the RMLG 110 is not downlocked. In such an example, the first RMLG downlock sensor 314 and the second RMLG downlock sensor 316 of FIG. 3 may be implemented as proximity sensors that sense and/or detect the position of the first one of the downlock members of the RMLG 110 relative to the second one of the downlock members and/or the other structural member of the RMLG 110.

The first RMLG downlock sensor 314 of FIG. 3 is located, mounted on, and/or otherwise structurally coupled to the RMLG 110 of FIG. 1, and is operatively coupled to the first control system 338, the first memory 340, and/or, more generally, the controller 336 of FIG. 3. RMLG downlock status data sensed and/or detected by the first RMLG downlock sensor 314 of FIG. 3 may be stored in the first memory 340 of FIG. 3, and may be accessed by the first control system 338 and/or, more generally, by the controller 336 of FIG. 3 either from the first memory 340 of FIG. 3 or directly from the first RMLG downlock sensor 314 of FIG. 3. In some examples, the first RMLG downlock sensor 314 of FIG. 3 may constantly sense and/or constantly detect the RMLG downlock status data. In other examples, the first RMLG downlock sensor 314 of FIG. 3 may periodically sense and/or periodically detect the RMLG downlock status data based on a timing interval and/or a sampling frequency implemented via the first control system 338 and/or the controller 336 of FIG. 3.

The second RMLG downlock sensor 316 of FIG. 3 is also located, mounted on, and/or otherwise structurally coupled to the RMLG 110 of FIG. 1, but is operatively coupled to the second control system 342, the second memory 344, and/or, more generally, the controller 336 of FIG. 3. RMLG downlock status data sensed and/or detected by the second RMLG downlock sensor 316 of FIG. 3 may be stored in the second memory 344 of FIG. 3, and may be accessed by the second control system 342 and/or, more generally, by the controller 336 of FIG. 3 either from the second memory 344 of FIG. 3 or directly from the second RMLG downlock sensor 316 of FIG. 3. In some examples, the second RMLG downlock sensor 316 of FIG. 3 may constantly sense and/or constantly detect the RMLG downlock status data. In other examples, the second RMLG downlock sensor 316 of FIG. 3 may periodically sense and/or periodically detect the RMLG downlock status data based on a timing interval and/or a sampling frequency implemented via the second control system 342 and/or the controller 336 of FIG. 3.

Each of the first LMLG shrunk sensor 318 and the second LMLG shrunk sensor 320 of FIG. 3 senses and/or detects whether the LMLG 106 of FIG. 1 is shrunk (e.g., LMLG shrunk status data). For example, a structural member (e.g., a shock strut) of the LMLG 106 of FIG. 1 may contract (e.g., shrink) or expand (e.g., unshrink) in response to a supply pressure associated with the landing gear hydraulic actuation system of the aircraft 100 of FIG. 1. In such an example, a first end of the structural member of the LMLG 106 may be spaced at a first distance from a second end of the structural member of the LMLG 106 when the structural member of the LMLG 106 is shrunk, and may be spaced at a second distance from the second end of the structural member of the LMLG 106 greater than the first distance when the structural member of the LMLG 106 is not shrunk. In such an example, the first LMLG shrunk sensor 318 and the second LMLG shrunk sensor 320 of FIG. 3 may be implemented as proximity sensors that sense and/or detect the position of the first end of the structural member of the LMLG 106 relative to the second end of the structural member of the LMLG 106.

The first LMLG shrunk sensor 318 of FIG. 3 is located, mounted on, and/or otherwise structurally coupled to the LMLG 106 of FIG. 1, and is operatively coupled to the first control system 338, the first memory 340, and/or, more generally, the controller 336 of FIG. 3. LMLG shrunk status data sensed and/or detected by the first LMLG shrunk sensor 318 of FIG. 3 may be stored in the first memory 340 of FIG. 3, and may be accessed by the first control system 338 and/or, more generally, by the controller 336 of FIG. 3 either from the first memory 340 of FIG. 3 or directly from the first LMLG shrunk sensor 318 of FIG. 3. In some examples, the first LMLG shrunk sensor 318 of FIG. 3 may constantly sense and/or constantly detect the LMLG shrunk status data. In other examples, the first LMLG shrunk sensor 318 of FIG. 3 may periodically sense and/or periodically detect the LMLG shrunk status data based on a timing interval and/or a sampling frequency implemented via the first control system 338 and/or the controller 336 of FIG. 3.

The second LMLG shrunk sensor 320 of FIG. 3 is also located, mounted on, and/or otherwise structurally coupled to the LMLG 106 of FIG. 1, but is operatively coupled to the second control system 342, the second memory 344, and/or, more generally, the controller 336 of FIG. 3. LMLG shrunk status data sensed and/or detected by the second LMLG shrunk sensor 320 of FIG. 3 may be stored in the second memory 344 of FIG. 3, and may be accessed by the second control system 342 and/or, more generally, by the controller 336 of FIG. 3 either from the second memory 344 of FIG. 3 or directly from the second LMLG shrunk sensor 320 of FIG. 3. In some examples, the second LMLG shrunk sensor 320 of FIG. 3 may constantly sense and/or constantly detect the LMLG shrunk status data. In other examples, the second LMLG shrunk sensor 320 of FIG. 3 may periodically sense and/or periodically detect the LMLG shrunk status data based on a timing interval and/or a sampling frequency implemented via the second control system 342 and/or the controller 336 of FIG. 3.

Each of the first RMLG shrunk sensor 322 and the second RMLG shrunk sensor 324 of FIG. 3 senses and/or detects whether the RMLG 110 of FIG. 1 is shrunk (e.g., RMLG shrunk status data). For example, a structural member (e.g., a shock strut) of the RMLG 110 of FIG. 1 may contract (e.g., shrink) or expand (e.g., unshrink) in response to a supply pressure associated with the landing gear hydraulic actuation system of the aircraft 100 of FIG. 1. In such an example, a first end of the structural member of the RMLG 110 may be spaced at a first distance from a second end of the structural member of the RMLG 110 when the structural member of the RMLG 110 is shrunk, and may be spaced at a second distance from the second end of the structural member of the RMLG 110 greater than the first distance when the structural member of the RMLG 110 is not shrunk. In such an example, the first RMLG shrunk sensor 322 and the second RMLG shrunk sensor 324 of FIG. 3 may be implemented as proximity sensors that sense and/or detect the position of the first end of the structural member of the RMLG 110 relative to the second end of the structural member of the RMLG 110.

The first RMLG shrunk sensor 322 of FIG. 3 is located, mounted on, and/or otherwise structurally coupled to the RMLG 110 of FIG. 1, and is operatively coupled to the first control system 338, the first memory 340, and/or, more generally, the controller 336 of FIG. 3. RMLG shrunk status data sensed and/or detected by the first RMLG shrunk sensor 322 of FIG. 3 may be stored in the first memory 340 of FIG. 3, and may be accessed by the first control system 338 and/or, more generally, by the controller 336 of FIG. 3 either from the first memory 340 of FIG. 3 or directly from the first RMLG shrunk sensor 322 of FIG. 3. In some examples, the first RMLG shrunk sensor 322 of FIG. 3 may constantly sense and/or constantly detect the RMLG shrunk status data. In other examples, the first RMLG shrunk sensor 322 of FIG. 3 may periodically sense and/or periodically detect the RMLG shrunk status data based on a timing interval and/or a sampling frequency implemented via the first control system 338 and/or the controller 336 of FIG. 3.

The second RMLG shrunk sensor 324 of FIG. 3 is also located, mounted on, and/or otherwise structurally coupled to the RMLG 110 of FIG. 1, but is operatively coupled to the second control system 342, the second memory 344, and/or, more generally, the controller 336 of FIG. 3. RMLG shrunk status data sensed and/or detected by the second RMLG shrunk sensor 324 of FIG. 3 may be stored in the second memory 344 of FIG. 3, and may be accessed by the second control system 342 and/or, more generally, by the controller 336 of FIG. 3 either from the second memory 344 of FIG. 3 or directly from the second RMLG shrunk sensor 324 of FIG. 3. In some examples, the second RMLG shrunk sensor 324 of FIG. 3 may constantly sense and/or constantly detect the RMLG shrunk status data. In other examples, the second RMLG shrunk sensor 324 of FIG. 3 may periodically sense and/or periodically detect the RMLG shrunk status data based on a timing interval and/or a sampling frequency implemented via the second control system 342 and/or the controller 336 of FIG. 3.

The LTL position sensor 326 of FIG. 3 senses, measures and/or detects a position (e.g., an angular position and/or angular displacement) of a left throttle lever of the aircraft 100 of FIG. 1 (e.g., left throttle lever position data). In some examples, the LTL position sensor 326 of FIG. 3 may sense and/or detect whether the position of the left throttle lever exceeds a throttle lever position threshold (e.g., throttle lever position threshold data). The LTL position sensor 326 of FIG. 3 is operatively coupled to a left throttle lever located within a cockpit of the aircraft 100 of FIG. 1, and is also operatively coupled to the first control system 338, the first memory 340, and/or, more generally, the controller 336 of FIG. 3. Left throttle lever position data sensed, measured and/or detected by the LTL position sensor 326 of FIG. 3 may be stored in the first memory 340 of FIG. 3, and may be accessed by the first control system 338 and/or, more generally, by the controller 336 of FIG. 3 either from the first memory 340 of FIG. 3 or directly from the LTL position sensor 326 of FIG. 3. In some examples, the LTL position sensor 326 of FIG. 3 may constantly sense and/or constantly detect the left throttle lever position data. In other examples, the LTL position sensor 326 of FIG. 3 may periodically sense and/or periodically detect the left throttle lever position data based on a timing interval and/or a sampling frequency implemented via the first control system 338 and/or the controller 336 of FIG. 3.

In other examples (e.g., in examples where the aircraft 100 of FIG. 1 is an unmanned and/or autonomous aircraft), the LTL position sensor 326 of FIG. 3 may be operatively coupled to a left throttle position manager (e.g., a programmable processor) instead of a left throttle lever. In such examples, the LTL position sensor 326 of FIG. 3 may sense, measure and/or detect a left throttle position input corresponding to a remotely programmed, commanded, and/or set state of the left throttle position manager, as described above. The examples provided herein relative to the LTL position sensor 326 of FIG. 3 sensing, measuring and/or detecting a position of a left throttle lever of the aircraft 100 of FIG. 1 should accordingly be understood to alternatively apply to the LTL position sensor 326 sensing, measuring and/or detecting a left throttle position input corresponding to a remotely programmed, commanded, and/or set state of the left throttle position manager.

The RTL position sensor 328 of FIG. 3 senses, measures and/or detects a position (e.g., an angular position and/or angular displacement) of a right throttle lever of the aircraft 100 of FIG. 1 (e.g., right throttle lever position data). In some examples, the RTL position sensor 328 of FIG. 3 may sense and/or detect whether the position of the right throttle lever exceeds a throttle lever position threshold (e.g., throttle lever position threshold data). The RTL position sensor 328 of FIG. 3 is operatively coupled to a right throttle lever located within a cockpit of the aircraft 100 of FIG. 1, and is also operatively coupled to the second control system 342, the second memory 344, and/or, more generally, the controller 336 of FIG. 3. Right throttle lever position data sensed, measured and/or detected by the RTL position sensor 328 of FIG. 3 may be stored in the second memory 344 of FIG. 3, and may be accessed by the second control system 342 and/or, more generally, by the controller 336 of FIG. 3 either from the second memory 344 of FIG. 3 or directly from the RTL position sensor 328 of FIG. 3. In some examples, the RTL position sensor 328 of FIG. 3 may constantly sense and/or constantly detect the right throttle lever position data. In other examples, the RTL position sensor 328 of FIG. 3 may periodically sense and/or periodically detect the right throttle lever position data based on a timing interval and/or a sampling frequency implemented via the second control system 342 and/or the controller 336 of FIG. 3.

In other examples (e.g., in examples where the aircraft 100 of FIG. 1 is an unmanned and/or autonomous aircraft), the RTL position sensor 328 of FIG. 3 may be operatively coupled to a right throttle position manager (e.g., a programmable processor) instead of a right throttle lever. In such examples, the RTL position sensor 328 of FIG. 3 may sense, measure and/or detect a right throttle position input corresponding to a remotely programmed, commanded, and/or set state of the right throttle position manager, as described above. The examples provided herein relative to the RTL position sensor 328 of FIG. 3 sensing, measuring and/or detecting a position of a right throttle lever of the aircraft 100 of FIG. 1 should accordingly be understood to alternatively apply to the RTL position sensor 328 sensing, measuring and/or detecting a right throttle position input corresponding to a remotely programmed, commanded, and/or set state of the right throttle position manager.

The LE speed sensor 330 of FIG. 3 senses, measures and/or detects a speed (e.g., an angular and/or rotational velocity) of the left engine 118 of the aircraft 100 of FIG. 1 (e.g., left engine speed data). In some examples, the LE speed sensor 330 of FIG. 3 may sense and/or detect whether the speed of the left engine exceeds an engine speed threshold (e.g., engine speed threshold data). The LE speed sensor 330 of FIG. 3 is operatively coupled to the left engine 118 of the aircraft 100 of FIG. 1, and is also operatively coupled to the first control system 338, the first memory 340, and/or, more generally, the controller 336 of FIG. 3. Left engine speed data sensed, measured and/or detected by the LE speed sensor 330 of FIG. 3 may be stored in the first memory 340 of FIG. 3, and may be accessed by the first control system 338 and/or, more generally, by the controller 336 of FIG. 3 either from the first memory 340 of FIG. 3 or directly from the LE speed sensor 330 of FIG. 3. In some examples, the LE speed sensor 330 of FIG. 3 may constantly sense and/or constantly detect the left engine speed data. In other examples, the LE speed sensor 330 of FIG. 3 may periodically sense and/or periodically detect the left engine speed data based on a timing interval and/or a sampling frequency implemented via the first control system 338 and/or the controller 336 of FIG. 3.

The RE speed sensor 332 of FIG. 3 senses, measures and/or detects a speed (e.g., an angular and/or rotational velocity) of the right engine 120 of the aircraft 100 of FIG. 1 (e.g., right engine speed data). In some examples, the RE speed sensor 332 of FIG. 3 may sense and/or detect whether the speed of the right engine exceeds an engine speed threshold (e.g., engine speed threshold data). The RE speed sensor 332 of FIG. 3 is operatively coupled to the right engine 120 of the aircraft 100 of FIG. 1, and is also operatively coupled to the second control system 342, the second memory 344, and/or, more generally, the controller 336 of FIG. 3. Right engine speed data sensed, measured and/or detected by the RE speed sensor 332 of FIG. 3 may be stored in the second memory 344 of FIG. 3, and may be accessed by the second control system 342 and/or, more generally, by the controller 336 of FIG. 3 either from the second memory 344 of FIG. 3 or directly from the RE speed sensor 332 of FIG. 3. In some examples, the RE speed sensor 332 of FIG. 3 may constantly sense and/or constantly detect the right engine speed data. In other examples, the RE speed sensor 332 of FIG. 3 may periodically sense and/or periodically detect the right engine speed data based on a timing interval and/or a sampling frequency implemented via the first control system 338 and/or the controller 336 of FIG. 3.

The LGL position sensor 334 of FIG. 3 senses, measures and/or detects a position (e.g., an up position or a down position) of a landing gear lever of the aircraft 100 of FIG. 1 (e.g., landing gear lever position data). The LGL position sensor 334 of FIG. 3 is operatively coupled to a landing gear lever located within a cockpit of the aircraft 100 of FIG. 1, and is also operatively coupled to the first control system 338, the first memory 340, the second control system 342, the second memory 344, and/or, more generally, the controller 336 of FIG. 3. Landing gear lever position data sensed, measured and/or detected by the LGL position sensor 334 of FIG. 3 may be stored in the first memory 340 and/or the second memory 344 of FIG. 3, and may be accessed by the first control system 338, the second control system 342, and/or, more generally, by the controller 336 of FIG. 3 from either the first memory 340 or the second memory 344 of FIG. 3, or directly from the LGL position sensor 334 of FIG. 3. In some examples, the LGL position sensor 334 of FIG. 3 may constantly sense and/or constantly detect the landing gear lever position data. In other examples, the LGL position sensor 334 of FIG. 3 may periodically sense and/or periodically detect the landing gear lever position data based on a timing interval and/or a sampling frequency implemented via the first control system 338, the second control system 342, and/or the controller 336 of FIG. 3.

In other examples (e.g., in examples where the aircraft 100 of FIG. 1 is an unmanned and/or autonomous aircraft), the LGL position sensor 334 of FIG. 3 may be operatively coupled to a landing gear position manager (e.g., a programmable processor) instead of a landing gear lever. In such examples, the LGL position sensor 334 of FIG. 3 may sense, measure and/or detect a landing gear position input corresponding to a remotely programmed, commanded, and/or set state of the landing gear position manager, as described above. The examples provided herein relative to the LGL position sensor 334 of FIG. 3 sensing, measuring and/or detecting a position of a landing gear lever of the aircraft 100 of FIG. 1 should accordingly be understood to alternatively apply to the LGL position sensor 334 sensing, measuring and/or detecting a landing gear position input corresponding to a remotely programmed, commanded, and/or set state of the landing gear position manager.

The controller 336 of FIG. 3 may be implemented by a semiconductor device such as a processor, microprocessor, controller or microcontroller. In the illustrated example of FIG. 3, the controller 336 manages and/or controls the control relay 346 and/or the motor 348 of FIG. 3 based on LMLG on-ground status data, RMLG on-ground status data, LMLG downlock status data, RMLG downlock status data, LMLG shrunk status data, RMLG shrunk status data, left throttle lever position data, right throttle lever position data, left engine speed data, right engine speed data, and/or landing gear lever position data received, obtained and/or accessed by the controller 336 from the first control system 338 and/or the second control system 342 of FIG. 3. The first control system 338 and the second control system 342 of FIG. 3 are redundant control systems capable of exchanging data with one another and/or with the controller 336 of FIG. 3.

The first control system 338 of FIG. 3 determines whether the first set of wheels 108 of the LMLG 106 of FIG. 1 is in contact with a ground surface based on the LMLG on-ground status data sensed and/or detected via the first LMLG on-ground sensor 302 of FIG. 3. The first control system 338 determines whether the second set of wheels 112 of the RMLG 110 of FIG. 1 is in contact with a ground surface based on the RMLG on-ground status data sensed and/or detected via the first RMLG on-ground sensor 306 of FIG. 3. The first control system 338 determines whether the LMLG 106 of FIG. 1 is downlocked based on the LMLG downlock status data sensed and/or detected via the first LMLG downlock sensor 310 of FIG. 3. The first control system 338 determines whether the RMLG 110 of FIG. 1 is downlocked based on the RMLG downlock status data sensed and/or detected via the first RMLG downlock sensor 314 of FIG. 3. The first control system 338 determines whether the LMLG 106 of FIG. 1 is shrunk based on the LMLG shrunk status data sensed and/or detected via the first LMLG shrunk sensor 318 of FIG. 3. The first control system 338 determines whether the RMLG 110 of FIG. 1 is shrunk based on the RMLG shrunk status data sensed and/or detected via the first RMLG shrunk sensor 322 of FIG. 3.

The first control system 338 of FIG. 3 determines a position of a left throttle lever of the aircraft 100 of FIG. 1 based on left throttle lever position data sensed and/or detected via the LTL position sensor 326 of FIG. 3. In some examples, the first control system 338 may determine whether the left throttle lever position data exceeds a throttle lever position threshold. The first control system 338 determines a speed of the left engine 118 of FIG. 1 based on left engine speed data sensed and/or detected via the LE speed sensor 330 of FIG. 3. In some examples, the first control system 338 may determine whether the left engine speed data exceeds an engine speed threshold. The first control system 338 determines a position of a landing gear lever of the aircraft 100 of FIG. 1 based on landing gear lever position data sensed and/or detected via the LGL position sensor 334 of FIG. 3. In some examples, the first control system 338 may determine whether the landing gear lever is in an up position or a down position based on the landing gear lever position data.

The first memory 340 of FIG. 3 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the first memory 340 may be stored in any file and/or data structure format, organization scheme, and/or arrangement.

Data and/or information received by the first control system 338 and/or, more generally, by the controller 336 of FIG. 3 from the first LMLG on-ground sensor 302, the first RMLG on-ground sensor 306, the first LMLG downlock sensor 310, the first RMLG downlock sensor 314, the first LMLG shrunk sensor 318, the first RMLG shrunk sensor 322, the LTL position sensor 326, the LE speed sensor 330, and/or the LGL position sensor 334 of FIG. 3 may be stored in the first memory 340 of FIG. 3. Data and/or information corresponding to any of the above-described LMLG on-ground status data associated with the first LMLG on-ground sensor 302, RMLG on-ground status data associated with the first RMLG on-ground sensor 306, LMLG downlock status data associated with the first LMLG downlock sensor 310, RMLG downlock status data associated with the first RMLG downlock sensor 314, LMLG shrunk status data associated with the first LMLG shrunk sensor 318, RMLG shrunk status data associated with the first RMLG shrunk sensor 322, left throttle lever position data, throttle lever position threshold data, left engine speed data, engine speed threshold data, and/or landing gear lever position data may be stored in the first memory 340. Data and/or information stored in the first memory 340 is accessible to the first control system 338 and/or, more generally, to the controller 336 of FIG. 3. In some examples, data and/or information stored in the first memory 340 may be transferred to the second memory 344 of FIG. 3.

The second control system 342 of FIG. 3 determines whether the first set of wheels 108 of the LMLG 106 of FIG. 1 is in contact with a ground surface based on the LMLG on-ground status data sensed and/or detected via the second LMLG on-ground sensor 304 of FIG. 3. The second control system 342 determines whether the second set of wheels 112 of the RMLG 110 of FIG. 1 is in contact with a ground surface based on the RMLG on-ground status data sensed and/or detected via the second RMLG on-ground sensor 308 of FIG. 3. The second control system 342 determines whether the LMLG 106 of FIG. 1 is downlocked based on the LMLG downlock status data sensed and/or detected via the second LMLG downlock sensor 312 of FIG. 3. The second control system 342 determines whether the RMLG 110 of FIG. 1 is downlocked based on the RMLG downlock status data sensed and/or detected via the second RMLG downlock sensor 316 of FIG. 3. The second control system 342 determines whether the LMLG 106 of FIG. 1 is shrunk based on the LMLG shrunk status data sensed and/or detected via the second LMLG shrunk sensor 320 of FIG. 3. The second control system 342 determines whether the RMLG 110 of FIG. 1 is shrunk based on the RMLG shrunk status data sensed and/or detected via the second RMLG shrunk sensor 324 of FIG. 3.

The second control system 342 of FIG. 3 determines a position of a right throttle lever of the aircraft 100 of FIG. 1 based on right throttle lever position data sensed and/or detected via the RTL position sensor 328 of FIG. 3. In some examples, the second control system 342 may determine whether the right throttle lever position data exceeds a throttle lever position threshold. The second control system 342 determines a speed of the right engine 120 of FIG. 1 based on right engine speed data sensed and/or detected via the RE speed sensor 332 of FIG. 3. In some examples, the second control system 342 may determine whether the right engine speed data exceeds an engine speed threshold. The second control system 342 determines a position of a landing gear lever of the aircraft 100 of FIG. 1 based on landing gear lever position data sensed and/or detected via the LGL position sensor 334 of FIG. 3. In some examples, the second control system 342 may determine whether the landing gear lever is in an up position or a down position based on the landing gear lever position data.

The second memory 344 of FIG. 3 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the second memory 344 may be stored in any file and/or data structure format, organization scheme, and/or arrangement.

Data and/or information received by the second control system 342 and/or, more generally, by the controller 336 of FIG. 3 from the second LMLG on-ground sensor 304, the second RMLG on-ground sensor 308, the second LMLG downlock sensor 312, the second RMLG downlock sensor 316, the second LMLG shrunk sensor 320, the second RMLG shrunk sensor 324, the RTL position sensor 328, the RE speed sensor 332, and/or the LGL position sensor 334 of FIG. 3 may be stored in the second memory 344 of FIG. 3. Data and/or information corresponding to any of the above-described LMLG on-ground status data associated with the second LMLG on-ground sensor 304, RMLG on-ground status data associated with the second RMLG on-ground sensor 308, LMLG downlock status data associated with the second LMLG downlock sensor 312, RMLG downlock status data associated with the second RMLG downlock sensor 316, LMLG shrunk status data associated with the second LMLG shrunk sensor 320, RMLG shrunk status data associated with the second RMLG shrunk sensor 324, right throttle lever position data, throttle lever position threshold data, right engine speed data, engine speed threshold data, and/or landing gear lever position data may be stored in the second memory 344. Data and/or information stored in the second memory 344 is accessible to the second control system 342 and/or, more generally, to the controller 336 of FIG. 3. In some examples, data and/or information stored in the second memory 344 may be transferred to the first memory 340 of FIG. 3.

The first control system 338 and/or, more generally, the controller 336 of FIG. 3 generates one or more control signal(s) indicating that the LMLG 106 and/or the RMLG 110 of FIG. 1 is/are to be either shrunk or unshrunk based on the above-described data received at the first control system 338 and/or stored in the first memory 340. An example control logic diagram to be executed and/or otherwise implemented via the first control system 338 and/or, more generally, the controller 336 of FIG. 3 to generate control signal(s) to either shrink or unshrink the LMLG 106 and the RMLG 110 of FIG. 1 is described below in connection with FIG. 5. As shown in the illustrated example of FIG. 3, one of either a shrink command or an unshrink command corresponding to the control signal(s) generated via the first control system 338 and/or the controller 336 of FIG. 3 is transmitted, conveyed, and/or otherwise relayed from the first control system 338 and/or the controller 336 of FIG. 3 to the control relay 346 of FIG. 3. The control relay 346 of FIG. 3 transmits, conveys, and/or otherwise relays a corresponding one of a shrink command or an unshrink command to the motor 348 of FIG. 3 to provide power to the motor 348 based on the shrink command or the unshrink command received at the control relay 346 from the first control system 338 and/or the controller 336 of FIG. 3.

The second control system 342 and/or, more generally, the controller 336 of FIG. 3 also generates one or more control signal(s) indicating that the LMLG 106 and/or the RMLG 110 of FIG. 1 is/are to be either shrunk or unshrunk based on the above-described data received at the second control system 342 and/or stored in the second memory 344. An example control logic diagram to be executed and/or otherwise implemented via the second control system 342 and/or, more generally, the controller 336 of FIG. 3 to generate control signal(s) to either shrink or unshrink the LMLG 106 and the RMLG 110 of FIG. 1 is described below in connection with FIG. 5. As shown in the illustrated example of FIG. 3, one of either a shrink command or an unshrink command corresponding to the control signal(s) generated via the second control system 342 and/or the controller 336 of FIG. 3 is transmitted, conveyed, and/or otherwise relayed from the second control system 342 and/or the controller 336 of FIG. 3 to the control relay 346 of FIG. 3. The control relay 346 of FIG. 3 transmits, conveys, and/or otherwise relays a corresponding one of a shrink command or an unshrink command to the motor 348 of FIG. 3 to provide power to the motor 348 based on the shrink command or the unshrink command received at the control relay 346 from the second control system 342 and/or the controller 336 of FIG. 3.

The motor 348 of FIG. 3 controls and/or actuates the three-way control valve 350 of FIG. 3 based on the shrink command or the unshrink command received from the control relay 346 of FIG. 3. In the illustrated example of FIG. 3, the three-way control valve 350 has a flow control member (e.g., a disc, a plug, a ball, etc.) that is moveable between an open position and a closed position. The motor 348 of FIG. 3 actuates and or moves the flow control member of the three-way control valve 350 from the closed position to the open position in response to a shrink command received at the motor 348. When the flow control member of the three-way control valve 350 of FIG. 3 is in the open position, pressurized fluid supplied via a supply pressure conduit and/or line of an example hydraulic system 354 of FIG. 3 (e.g., a hydraulic system of the aircraft 100 of FIG. 1) passes through the check valve 352 of FIG. 3 to the three-way control valve 350, and through the three-way control valve 350 to a shrink pressure conduit and/or line of an example landing gear hydraulic actuation system 356 of FIG. 3 (e.g., a landing gear hydraulic actuation system of the aircraft 100 of FIG. 1). The pressurized fluid received via the shrink pressure line of the landing gear hydraulic actuation system 356 of FIG. 3 causes the LMLG 106 and/or the RMLG 110 of FIG. 1 to shrink.

The check valve 352 of FIG. 3 is operatively coupled to the supply pressure line, and accordingly prevents pressurized fluid received via the shrink pressure line of the landing gear hydraulic actuation system 356 of FIG. 3 from returning to the hydraulic system 354 of FIG. 3 via the supply pressure line. The flow member of the three-way control valve 350 of FIG. 3 prevents pressurized fluid received via the shrink pressure line of the landing gear hydraulic actuation system 356 of FIG. 3 from being vented when the flow control member of the three-way control valve 350 of FIG. 3 is in the open position. The check valve 352 and the flow control member of the three-way control valve 350 accordingly trap hydraulic fluid (e.g., maintain a hydraulic block) relative to the landing gear hydraulic actuation system 356 of FIG. 3 when the flow control member of the three-way control valve 350 of FIG. 3 is in the open position to hold the landing gear in a shrunken state should supply pressure associated with the hydraulic system 354 of FIG. 3 be lost.

The motor 348 of FIG. 3 actuates and or moves the flow control member of the three-way control valve 350 from the open position to the closed position in response to an unshrink command received at the motor 348. When the flow control member of the three-way control valve 350 of FIG. 3 is in the closed position, pressurized fluid that may have previously been provided via the supply pressure line of the hydraulic system 354 of FIG. 3, through the check valve 352 of FIG. 3, and through the three-way control valve 350 to the shrink pressure line of the landing gear hydraulic actuation system 356 of FIG. 3, is returned via the shrink pressure line of the landing gear hydraulic actuation system 356 to the three-way control valve 350 by weight of the landing gear and applied air loads as the landing gear is lowered. The returned pressurized fluid exits and/or vents the three-way control valve 350 via a vent and/or a return. The landing gear hydraulic actuation system 356 of FIG. 3 causes the LMLG 106 and/or the RMLG 110 of FIG. 1 to unshrink in response to the flow control member of the three-way control valve 350 of FIG. 3 being moved from the open position to the closed position (e.g., in response to an unshrink command received at the motor 348 of FIG. 3).

Figure 4:
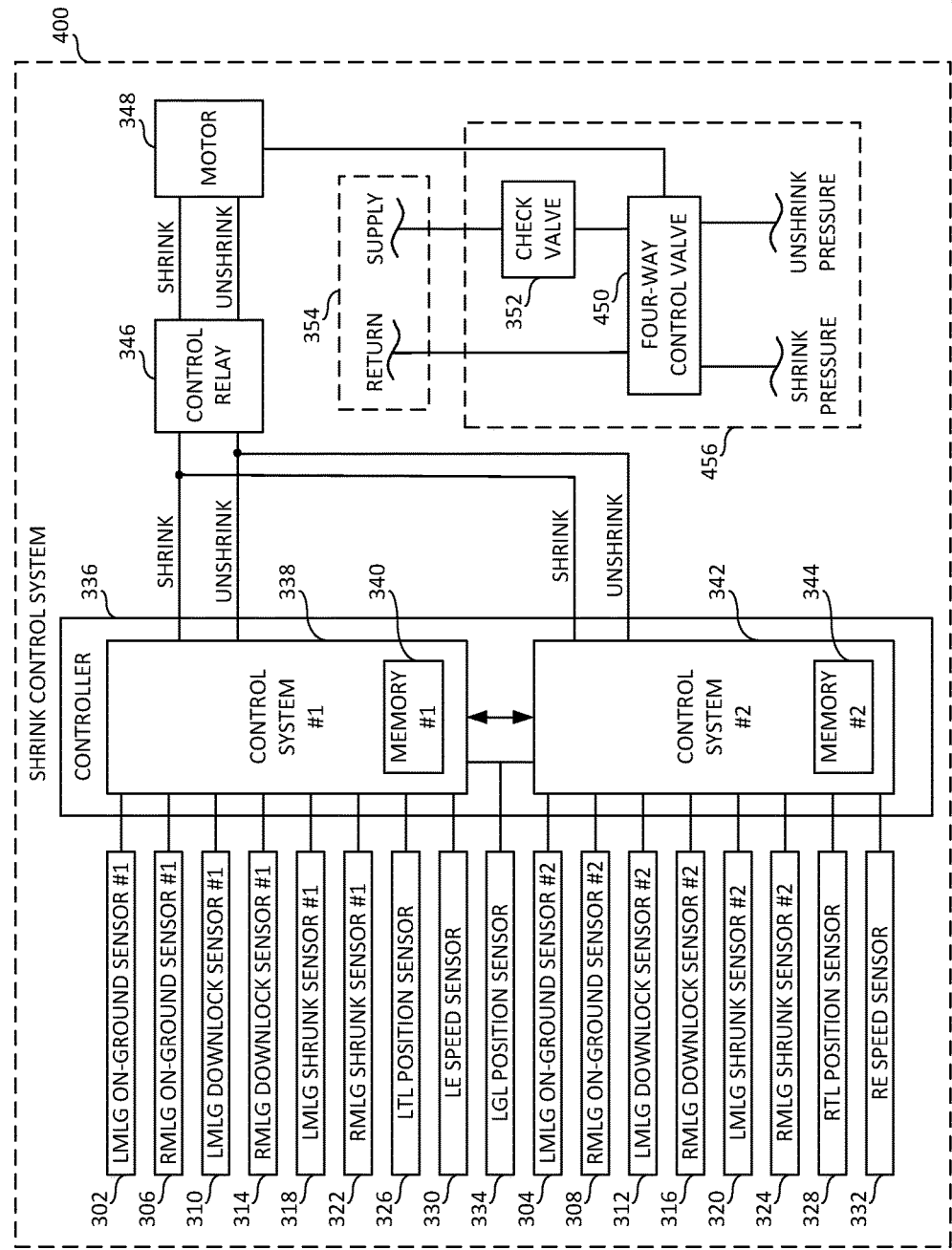
FIG. 4 is a block diagram of a second example shrink control system constructed in accordance with the teachings of this disclosure.

FIG. 4 is a block diagram of a second example shrink control system 400 constructed in accordance with the teachings of this disclosure. In the illustrated example of FIG. 4, the second shrink control system 400 includes the first LMLG on-ground sensor 302, the second LMLG on-ground sensor 304, the first RMLG on-ground sensor 306, the second RMLG on-ground sensor 308, the first LMLG downlock sensor 310, the second LMLG downlock sensor 312, the first RMLG downlock sensor 314, the second RMLG downlock sensor 316, the first LMLG shrunk sensor 318, the second LMLG shrunk sensor 320, the first RMLG shrunk sensor 322, the second RMLG shrunk sensor 324, the LTL position sensor 326, the RTL position sensor 328, the LE speed sensor 330, the RE speed sensor 332, the LGL position sensor 334, the controller 336, the first control system 338, the first memory 340, the second control system 342, the second memory 344, the control relay 346, the motor 348, and the check valve 352 of the first shrink control system 300 described above. In contrast to the first shrink control system 300 of FIG. 3 which included a three-way control valve 350 to implement a passive unshrink function (e.g., the oleo pressure and the landing gear weight cause the landing gear to unshrink), the second shrink control system 400 of FIG. 4 instead includes an example four-way control valve 450 to implement an active unshrink function (e.g., the oleo pressure and the landing gear weight are insufficient to cause the landing gear to unshrink).

In the illustrated example of FIG. 4, the four-way control valve 450 has a flow control member (e.g., a disc, a plug, a ball, etc.) that is moveable between a first open position to facilitate the provision of unshrink pressure via an unshrink pressure conduit and/or line of an example landing gear hydraulic actuation system 456 of FIG. 4 (e.g., a landing gear hydraulic actuation system of the aircraft 100 of FIG. 1), and a second open position to facilitate the provision of shrink pressure via a shrink pressure conduit and/or line of the landing gear hydraulic actuation system 456. The motor 348 of FIG. 4 actuates and/or moves the flow control member of the four-way control valve 450 from the first open position to the second open position in response to a shrink command received at the motor 348. When the flow control member of the four-way control valve 450 of FIG. 4 is in the second open position, pressurized fluid supplied via a supply pressure conduit and/or line of an example hydraulic system 354 of FIG. 4 (e.g., a hydraulic system of the aircraft 100 of FIG. 1) passes through the check valve 352 of FIG. 4 to the four-way control valve 450, and through the four-way control valve 450 to the shrink pressure line of the landing gear hydraulic actuation system 456 of FIG. 4. The pressurized fluid received via the shrink pressure line of the landing gear hydraulic actuation system 456 of FIG. 4 causes the LMLG 106 and/or the RMLG 110 of FIG. 1 to shrink.

The check valve 352 of FIG. 4 is operatively coupled to the supply pressure line, and accordingly prevents pressurized fluid received via the shrink pressure line of the landing gear hydraulic actuation system 456 of FIG. 4 from returning to the hydraulic system 354 of FIG. 4 via the supply pressure line. The flow member of the four-way control valve 450 of FIG. 4 prevents pressurized fluid received via the shrink pressure line of the landing gear hydraulic actuation system 456 of FIG. 4 from being vented when the flow control member of the four-way control valve 450 of FIG. 4 is in the second open position. The check valve 352 and the flow control member of the four-way control valve 450 accordingly trap hydraulic fluid (e.g., maintain a hydraulic block) relative to the landing gear hydraulic actuation system 456 of FIG. 4 to hold the landing gear in a shrunken state when the flow control member of the four-way control valve 450 of FIG. 4 is in the second open position.

The motor 348 of FIG. 4 actuates and or moves the flow control member of the four-way control valve 450 from the second open position to the first open position in response to an unshrink command received at the motor 348. When the flow control member of the four-way control valve 450 of FIG. 4 is in the first open position, pressurized fluid supplied via the supply pressure line of the hydraulic system 354 of FIG. 4 passes through the check valve 352 of FIG. 4 to the four-way control valve 450, and through the four-way control valve 450 to the unshrink pressure line of the landing gear hydraulic actuation system 456 of FIG. 4. The pressurized fluid received via the unshrink pressure line of the landing gear hydraulic actuation system 456 of FIG. 4, in combination with the landing gear weight and air loads, causes the LMLG 106 and/or the RMLG 110 of FIG. 1 to unshrink.

In some examples, pressurized fluid that may have previously been supplied from the supply pressure line of the hydraulic system 354 of FIG. 4 through the check valve 352 of FIG. 4 to the four-way control valve 450 of FIG. 4, and through the four-way control valve 450 to the shrink pressure line of the landing gear hydraulic actuation system 456 of FIG. 4, is returned via the shrink pressure line of the landing gear hydraulic actuation system 456 to the four-way control valve 450 when the flow control member of the four-way control valve 450 is in the first open position. In some examples, pressurized fluid that may have previously been supplied from the supply pressure line of the hydraulic system 354 of FIG. 4 through the check valve 352 of FIG. 4 to the four-way control valve 450 of FIG. 4, and through the four-way control valve 450 to the unshrink pressure line of the landing gear hydraulic actuation system 456 of FIG. 4, is returned via the unshrink pressure line of the landing gear hydraulic actuation system 456 to the four-way control valve 450 when the flow control member of the four-way control valve 450 is in the second open position. Pressurized fluid that is returned to the four-way control valve 450 of FIG. 4 from either the shrink pressure line or the unshrink pressure line exits and/or vents the four-way control valve 450 via one or more vent(s) and/or return(s).

Figure 5:
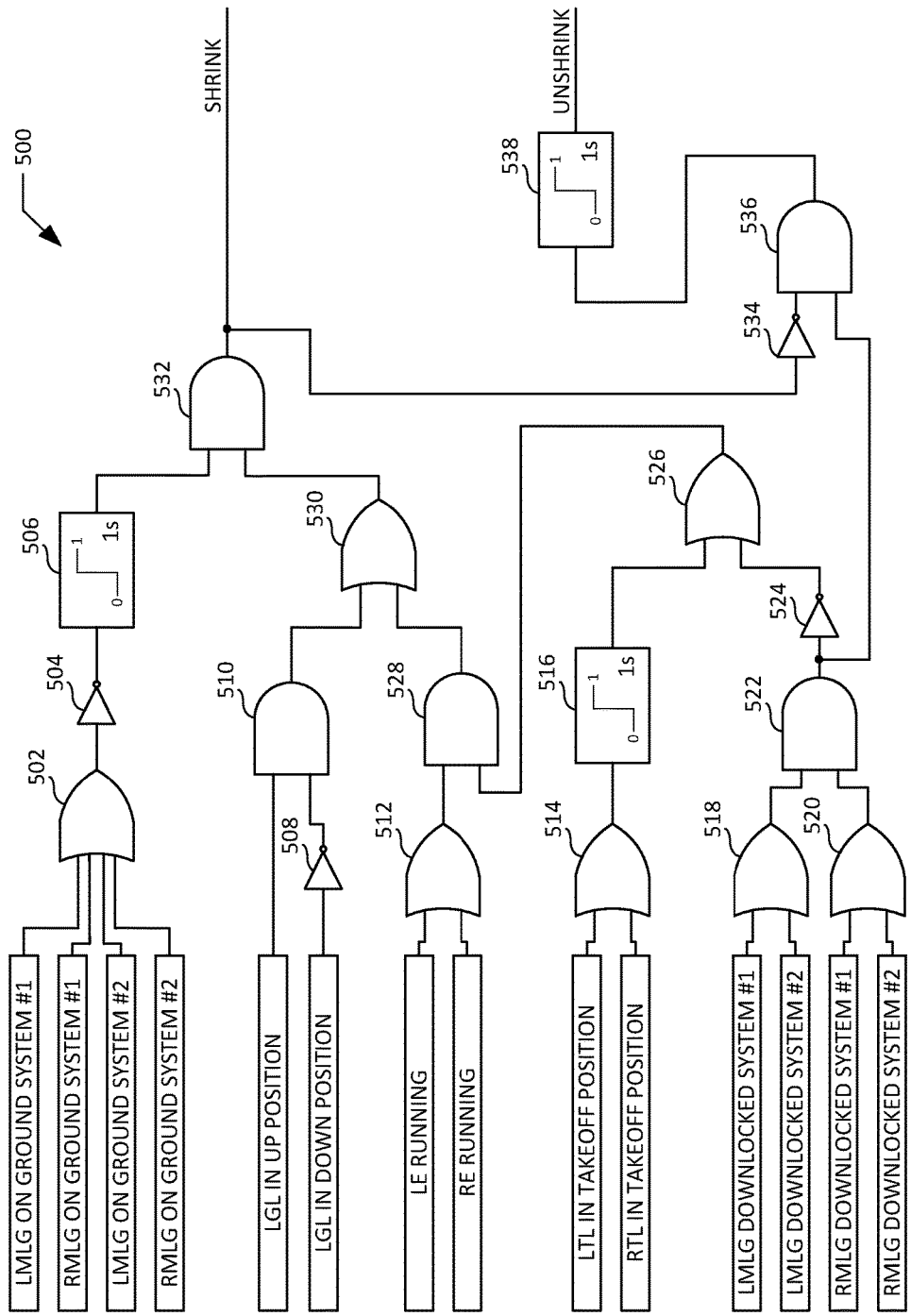
FIG. 5 is an example control logic diagram to be implemented by the example controller of FIGS. 3 and 4 to control landing gear shrink.

FIG. 5 is an example control logic diagram 500 to be implemented by the example controller 336 of FIGS. 3 and 4 to control landing gear shrink. The control logic diagram 500 of FIG. 5 includes a first example OR gate 502, a first example NOT gate 504, a first example time delay function 506, a second example NOT gate 508, a first example AND gate 510, a second example OR gate 512, a third example OR gate 514, a second example time delay function 516, a fourth example OR gate 518, a fifth example OR gate 520, a second example AND gate 522, a third example NOT gate 524, a sixth example OR gate 526, a third example AND gate 528, a seventh example OR gate 530, a fourth example AND gate 532, a fourth example NOT gate 534, a fifth example AND gate 536, and a third example time delay function 538 to be implemented via the controller 336 of FIGS. 3 and 4.

Each OR gate of the control logic diagram 500 of FIG. 5 produces a high output (e.g., output=1) if any input is high, and produces a low output (e.g., output=0) if all inputs are low. Each AND gate of the control logic diagram 500 of FIG. 5 produces a high output (e.g., output=1) if all inputs are high, and produces a low output (e.g., output=0) if any input is low. Each NOT gate of the control logic diagram 500 produces a high output (e.g., output=1) if the input is low, and produces a low output (e.g., output=0) if the input is high. Each time delay function introduces a time delay (e.g., a one second delay) into a subsequent process to be performed according to the control logic diagram 500 of FIG. 5 when the input to the time delay function transitions from low to high (e.g., from 0 to 1).

The first OR gate 502 of FIG. 5 produces a high output if any of the inputs from the first LMLG on-ground sensor 302, the second LMLG on-ground sensor 304, the first RMLG on-ground sensor 306, and/or the second RMLG on-ground sensor 308 of FIGS. 3 and 4 indicate that the first set of wheels 108 of the LMLG 106 or the second set of wheels 112 of the RMLG 110 of FIG. 1 is/are contacting a ground surface. The first OR gate 502 of FIG. 5 produces a low output if none of the inputs from the first LMLG on-ground sensor 302, the second LMLG on-ground sensor 304, the first RMLG on-ground sensor 306, and the second RMLG on-ground sensor 308 of FIGS. 3 and 4 indicate that the first set of wheels 108 of the LMLG 106 and the second set of wheels 112 of the RMLG 110 of FIG. 1 are contacting a ground surface. The output of the first OR gate 502 of FIG. 5 is transmitted, conveyed, and/or otherwise relayed as an input to the first NOT gate 504 of FIG. 5.

The first NOT gate 504 of FIG. 5 produces an output that is inverted relative to the input received from the first OR gate 502 of FIG. 5. The output of the first NOT gate 504 of FIG. 5 is transmitted, conveyed, and/or otherwise relayed as an input to the first time delay function 506 of FIG. 5.

The first time delay function 506 of FIG. 5 introduces a one second time delay into a subsequent process to be performed according to the control logic diagram 500 of FIG. 5 when the input to the first time delay function 506 of FIG. 5 transitions from low to high (e.g., from 0 to 1). The output of the first time delay function 506 of FIG. 5 is transmitted, conveyed, and/or otherwise relayed as an input to the fourth AND gate 532 of FIG. 5.

The second NOT gate 508 of FIG. 5 produces an output that is inverted relative to an input received from the LGL position sensor 334 of FIGS. 3 and 4. For example, the second NOT gate 508 of FIG. 5 produces a high output if an input received from the LGL position sensor 334 of FIGS. 3 and 4 indicates that a landing gear lever of the aircraft 100 of FIG. 1 is not in a down position. The output of the second NOT gate 508 of FIG. 5 is transmitted, conveyed, and/or otherwise relayed as an input to the first AND gate 510 of FIG. 5.

The first AND gate 510 of FIG. 5 produces a high output if an input from the LGL position sensor 334 of FIG. 3 indicates that a landing gear lever of the aircraft 100 of FIG. 1 is in an up position, and the input received from the second NOT gate 508 of FIG. 5 is high. The output of the first AND gate 510 of FIG. 5 is transmitted, conveyed, and/or otherwise relayed as an input to the seventh OR gate 530 of FIG. 5.

The second OR gate 512 of FIG. 5 produces a high output if the input from the LE speed sensor 330 of FIGS. 3 and 4 or the input from the RE speed sensor 332 of FIGS. 3 and 4 indicates that the left engine 118 or the right engine 120 of the aircraft 100 of FIG. 1 is running (e.g., that an engine speed of the left engine 118 or the right engine 120 exceeds an engine speed threshold). The second OR gate 512 of FIG. 5 produces a low output if neither the input from the LE speed sensor 330 of FIGS. 3 and 4 nor the input from the RE speed sensor 332 of FIGS. 3 and 4 indicates that the left engine 118 or the right engine 120 of the aircraft 100 of FIG. 1 is running. The output of the second OR gate 512 of FIG. 5 is transmitted, conveyed, and/or otherwise relayed as an input to the third AND gate 528 of FIG. 5.

The third OR gate 514 of FIG. 5 produces a high output if the input from the LTL position sensor 326 of FIGS. 3 and 4 or the input from the RTL position sensor 328 of FIGS. 3 and 4 indicates that the left throttle lever or the right throttle lever of the aircraft 100 of FIG. 1 is in a takeoff position (e.g., that a throttle lever position of the left throttle lever or the right throttle lever exceeds a throttle lever position threshold). The third OR gate 514 of FIG. 5 produces a low output if neither the input from the LTL position sensor 326 of FIGS. 3 and 4 nor the input from the RTL position sensor 328 of FIGS. 3 and 4 indicates that the left engine throttle lever or the right throttle lever of the aircraft 100 of FIG. 1 is in a takeoff position. The output of the third OR gate 514 of FIG. 5 is transmitted, conveyed, and/or otherwise relayed as an input to the second time delay function 516 of FIG. 5.

The second time delay function 516 of FIG. 5 introduces a one second time delay into a subsequent process to be performed according to the control logic diagram 500 of FIG. 5 when the input to the second time delay function 516 of FIG. 5 transitions from low to high (e.g., from 0 to 1). The output of the second time delay function 516 of FIG. 5 is transmitted, conveyed, and/or otherwise relayed as an input to the sixth OR gate 526 of FIG. 5.

The fourth OR gate 518 of FIG. 5 produces a high output if the input from the first LMLG downlock sensor 310 of FIGS. 3 and 4 or the input from the second LMLG downlock sensor 312 of FIGS. 3 and 4 indicates that the LMLG 106 of the aircraft 100 of FIG. 1 is downlocked. The fourth OR gate 518 of FIG. 5 produces a low output if neither the input from the first LMLG downlock sensor 310 of FIGS. 3 and 4 nor the input from the second LMLG downlock sensor 312 of FIGS. 3 and 4 indicates that the LMLG 106 of the aircraft 100 of FIG. 1 is downlocked. The output of the fourth OR gate 518 of FIG. 5 is transmitted, conveyed, and/or otherwise relayed as an input to the second AND gate 522 of FIG. 5.

The fifth OR gate 520 of FIG. 5 produces a high output if the input from the first RMLG downlock sensor 314 of FIGS. 3 and 4 or the input from the second RMLG downlock sensor 316 of FIGS. 3 and 4 indicates that the RMLG 110 of the aircraft 100 of FIG. 1 is downlocked. The fifth OR gate 520 of FIG. 5 produces a low output if neither the input from the first RMLG downlock sensor 314 of FIGS. 3 and 4 nor the input from the second RMLG downlock sensor 316 of FIGS. 3 and 4 indicates that the RMLG 110 of the aircraft 100 of FIG. 1 is downlocked. The output of the fifth OR gate 520 of FIG. 5 is transmitted, conveyed, and/or otherwise relayed as an input to the second AND gate 522 of FIG. 5.

The second AND gate 522 of FIG. 5 produces a high output if the input received from the fourth OR gate 518 of FIG. 5 and the input received from the fifth OR gate 520 of FIG. 5 are high. The second AND gate 522 of FIG. 5 produces a low output if either of the input received from the fourth OR gate 518 of FIG. 5 or the input received from the fifth OR gate 520 of FIG. 5 is low. The output of the second AND gate 522 of FIG. 5 is transmitted, conveyed, and/or otherwise relayed as an input to the third NOT gate 524 of FIG. 5, and is also transmitted, conveyed, and/or relayed as an input to the fifth AND gate 536 of FIG. 5.

The third NOT gate 524 of FIG. 5 produces an output that is inverted relative to the input received from the second AND gate 522 of FIG. 5. The output of the third NOT gate 524 of FIG. 5 is transmitted, conveyed, and/or otherwise relayed as an input to the sixth OR gate 526 of FIG. 5.

The sixth OR gate 526 of FIG. 5 produces a high output if either of the input received from the second time delay function 516 of FIG. 5 or the input received from the third NOT gate 524 of FIG. 5 is high. The sixth OR gate 526 of FIG. 5 produces a low output if the input received from the second time delay function 516 of FIG. 5 and the input received from the third NOT gate 524 of FIG. 5 are low. The output of the sixth OR gate 526 of FIG. 5 is transmitted, conveyed, and/or otherwise relayed as an input to the third AND gate 528 of FIG. 5.

The third AND gate 528 of FIG. 5 produces a high output if the input received from the second OR gate 512 of FIG. 5 and the input received from the sixth OR gate 526 of FIG. 5 are high. The third AND gate 528 of FIG. 5 produces a low output if either of the input received from the second OR gate 512 of FIG. 5 or the input received from the sixth OR gate 526 of FIG. 5 is low. The output of the third AND gate 528 of FIG. 5 is transmitted, conveyed, and/or otherwise relayed as an input to the seventh OR gate 530 of FIG. 5.

The seventh OR gate 530 of FIG. 5 produces a high output if either of the input received from the first AND gate 510 of FIG. 5 or the input received from the third AND gate 528 of FIG. 5 is high. The seventh OR gate 530 of FIG. 5 produces a low output if the input received from the first AND gate 510 of FIG. 5 and the input received from the third AND gate 528 of FIG. 5 are low. The output of the seventh OR gate 530 of FIG. 5 is transmitted, conveyed, and/or otherwise relayed as an input to the fourth AND gate 532 of FIG. 5.

The fourth AND gate 532 of FIG. 5 produces a high output if the input received from the first time delay function 506 of FIG. 5 and the input received from the seventh OR gate 530 of FIG. 5 are high. The fourth AND gate 532 of FIG. 5 produces a low output if either of the input received from the first time delay function 506 of FIG. 5 or the input received from the seventh OR gate 530 of FIG. 5 is low. In the illustrated example of FIG. 5, a high output of the fourth AND gate 532 of FIG. 5 generates a control signal and/or a shrink command to shrink the LMLG 106 and the RMLG 110 of the aircraft 100 of FIG. 1. The output of the fourth AND gate 532 of FIG. 5 is transmitted, conveyed, and/or otherwise relayed by the controller 336 of FIGS. 3 and 4 to the control relay 346 of FIGS. 3 and 4, and is also transmitted, conveyed, and/or relayed as an input to the fourth NOT gate 534 of FIG. 5.

The fourth NOT gate 534 of FIG. 5 produces an output that is inverted relative to the input received from the fourth AND gate 532 of FIG. 5. The output of the fourth NOT gate 534 of FIG. 5 is transmitted, conveyed, and/or otherwise relayed as an input to the fifth AND gate 536 of FIG. 5.

The fifth AND gate 536 of FIG. 5 produces a high output if the input received from the second AND gate 522 of FIG. 5 and the input received from the fourth NOT gate 534 of FIG. 5 are high. The fifth AND gate 536 of FIG. 5 produces a low output if either of the input received from the second AND gate 522 of FIG. 5 or the input received from the fourth NOT gate 534 of FIG. 5 is low. The output of the fifth AND gate 536 of FIG. 5 is transmitted, conveyed, and/or otherwise relayed as an input to the third time delay function 538 of FIG. 5.

The third time delay function 538 of FIG. 5 introduces a one second time delay into a subsequent process to be performed according to the control logic diagram 500 of FIG. 5 when the input to the third time delay function 538 of FIG. 5 transitions from low to high (e.g., from 0 to 1). In the illustrated example of FIG. 5, a high output of the third time delay function 538 of FIG. 5 generates a control signal and/or an unshrink command to unshrink the LMLG 106 and the RMLG 110 of the aircraft 100 of FIG. 1. The output of the third time delay function 538 of FIG. 5 is transmitted, conveyed, and/or otherwise relayed by the controller 336 of FIGS. 3 and 4 to the control relay 346 of FIGS. 3 and 4.

Based on the above-described operations of the control logic diagram 500 of FIG. 5, the controller 336 of FIGS. 3 and 4 may generate a control signal to shrink the LMLG 106 and the RMLG 110 of the aircraft 100 of FIG. 1 in response to determining: (1) that the inputs and/or data received from the first LMLG on-ground sensor 302, the second LMLG on-ground sensor 304, the first RMLG on-ground sensor 306, and the second RMLG on-ground sensor 308 of FIGS. 3 and 4 indicate that neither the first set of wheels 108 of the LMLG 106 nor the second set of wheels 112 of the RMLG 110 of the aircraft 100 of FIG. 1 is contacting a ground surface; and (2) that (a) the inputs and/or data received from the LE speed sensor 330 and the RE speed sensor 332 of FIGS. 3 and 4 indicate that at least one of the left engine 118 or the right engine 120 of the aircraft 100 of FIG. 1 is running (e.g., that an engine speed of the left engine or the right engine exceeds an engine speed threshold), and (b) the inputs and/or data received from the LTL position sensor 326 and the RTL position sensor 328 of FIGS. 3 and 4 indicate that at least one of a left throttle lever or a right throttle lever of the aircraft 100 of FIG. 1 is in a takeoff position (e.g., that a throttle lever position of the left throttle lever or the right throttle lever exceeds a throttle lever position threshold).

Further based on the above-described operations of the control logic diagram 500 of FIG. 5, the controller 336 of FIGS. 3 and 4 may alternatively generate a control signal to shrink the LMLG 106 and the RMLG 110 of the aircraft 100 of FIG. 1 in response to determining: (1) that the inputs and/or data received from the first LMLG on-ground sensor 302, the second LMLG on-ground sensor 304, the first RMLG on-ground sensor 306, and the second RMLG on-ground sensor 308 of FIGS. 3 and 4 indicate that neither the first set of wheels 108 of the LMLG 106 nor the second set of wheels 112 of the RMLG 110 of the aircraft 100 of FIG. 1 is contacting a ground surface; and (2) that (a) the inputs and/or data received from the LE speed sensor 330 and the RE speed sensor 332 indicate that at least one of the left engine 118 or the right engine 120 of the aircraft 100 of FIG. 1 is running (e.g., that an engine speed of the left engine or the right engine exceeds an engine speed threshold), and (b) the inputs and/or data received from the first LMLG downlock sensor 310, the second LMLG downlock sensor 312, the first RMLG downlock sensor 314, and the second RMLG downlock sensor 316 of FIGS. 3 and 4 indicate that at least one of the LMLG 106 or the RMLG 110 of the aircraft 100 of FIG. 1 is not downlocked.

Further based on the above-described operations of the control logic diagram 500 of FIG. 5, the controller 336 of FIGS. 3 and 4 may alternatively generate a control signal to shrink the LMLG 106 and the RMLG 110 of the aircraft 100 of FIG. 1 in response to determining: (1) that the inputs and/or data received from the first LMLG on-ground sensor 302, the second LMLG on-ground sensor 304, the first RMLG on-ground sensor 306, and the second RMLG on-ground sensor 308 of FIGS. 3 and 4 indicate that neither the first set of wheels 108 of the LMLG 106 nor the second set of wheels 112 of the RMLG 110 of the aircraft 100 of FIG. 1 is contacting a ground surface; and (2) that the inputs and/or data received from the LGL position sensor 334 of FIGS. 3 and 4 indicate that a landing gear lever of the aircraft 100 of FIG. 1 is in an up position and not in a down position.

Further based on the above-described operations of the control logic diagram 500 of FIG. 5, the controller 336 of FIGS. 3 and 4 may generate a control signal to unshrink the LMLG 106 and the RMLG 110 of the aircraft 100 of FIG. 1 in response to determining: (1) that the controller 336 is not currently generating and/or implementing a control signal to shrink the LMLG 106 and the RMLG 110 of FIG. 1; and (2) that the inputs and/or data received from the first LMLG downlock sensor 310, the second LMLG downlock sensor 312, the first RMLG downlock sensor 314, and the second RMLG downlock sensor 316 of FIGS. 3 and 4 indicate that the LMLG 106 or the RMLG 110 of the aircraft 100 of FIG. 1 are downlocked.

In some examples, the controller 336 of FIGS. 3 and 4 may inhibit and/or delay retraction of the LMLG 106 and/or the RMLG 110 of FIG. 1 based on the LMLG shrunk status data sensed and/or detected via the first LMLG shrunk sensor 318 and the second LMLG shrunk sensor 320 of FIGS. 3 and 4, and the RMLG shrunk status data sensed and/or detected via the first RMLG shrunk sensor 322 and the second RMLG shrunk sensor 324 of FIGS. 3 and 4. For example, when the landing gear lever position data sensed and/or detected via the LGL position sensor 334 of FIGS. 3 and 4 indicates that the landing gear lever is in the up position, the controller 336 may inhibit and/or delay retraction of the LMLG 106 and/or the RMLG 110 of FIG. 1 if either of the LMLG shrunk status data or the RMLG shrunk status data indicates that the LMLG 106 and/or the RMLG 110 is not yet shrunk. The retraction process may continue to be inhibited and/or delayed until the LMLG shrunk status data and the RMLG shrunk status data indicate that the LMLG 106 and the RMLG 110 are shrunk, thereby preventing the LMLG 106 and the RMLG 110 from being retracted while in an unshrunk state.

In some examples, the retraction process may be inhibited and/or delayed by electrically interrupting a command and/or signal associated with the up position of the landing gear lever, as sensed and/or detected via the LGL position sensor 334 of FIGS. 3 and 4, until the LMLG shrunk status data and the RMLG shrunk status data indicate that the LMLG 106 and the RMLG 110 are shrunk. In other examples, a shut-off valve may be operatively coupled to the controller 336 of FIGS. 3 and 4 to prevent retraction pressure from being ported to the LMLG 106 and/or the RMLG 110 of FIG. 1 until the LMLG shrunk status data and the RMLG shrunk status data indicate that the LMLG 106 and the RMLG 110 are shrunk.

While example manners of implementing the first shrink control system 300 and the second shrink control system 400 are illustrated in FIGS. 3-5, one or more of the elements, processes and/or devices illustrated in FIGS. 3-5 may be combined, divided, re-arranged, omitted, eliminated and/or implemented in any other way. Further, the first example LMLG on-ground sensor 302, the second example LMLG on-ground sensor 304, the first example RMLG on-ground sensor 306, the second example RMLG on-ground sensor 308, the first example LMLG downlock sensor 310, the second example LMLG downlock sensor 312, the first example RMLG downlock sensor 314, the second example RMLG downlock sensor 316, the first example LMLG shrunk sensor 318, the second example LMLG shrunk sensor 320, the first example RMLG shrunk sensor 322, the second example RMLG shrunk sensor 324, the example LTL position sensor 326, the example RTL position sensor 328, the example LE speed sensor 330, the example RE speed sensor 332, the example LGL position sensor 334, the example controller 336, the first example control system 338, the first example memory 340, the second example control system 342, the second example memory 344, the example control relay 346, and/or, more generally, the example shrink control systems 300, 400 of FIGS. 3-5 may be implemented by hardware, software, firmware and/or any combination of hardware, software and/or firmware. Thus, for example, any of the first example LMLG on-ground sensor 302, the second example LMLG on-ground sensor 304, the first example RMLG on-ground sensor 306, the second example RMLG on-ground sensor 308, the first example LMLG downlock sensor 310, the second example LMLG downlock sensor 312, the first example RMLG downlock sensor 314, the second example RMLG downlock sensor 316, the first example LMLG shrunk sensor 318, the second example LMLG shrunk sensor 320, the first example RMLG shrunk sensor 322, the second example RMLG shrunk sensor 324, the example LTL position sensor 326, the example RTL position sensor 328, the example LE speed sensor 330, the example RE speed sensor 332, the example LGL position sensor 334, the example controller 336, the first example control system 338, the first example memory 340, the second example control system 342, the second example memory 344, the example control relay 346, and/or, more generally, the example shrink control systems 300, 400 of FIGS. 3-5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the first example LMLG on-ground sensor 302, the second example LMLG on-ground sensor 304, the first example RMLG on-ground sensor 306, the second example RMLG on-ground sensor 308, the first example LMLG downlock sensor 310, the second example LMLG downlock sensor 312, the first example RMLG downlock sensor 314, the second example RMLG downlock sensor 316, the first example LMLG shrunk sensor 318, the second example LMLG shrunk sensor 320, the first example RMLG shrunk sensor 322, the second example RMLG shrunk sensor 324, the example LTL position sensor 326, the example RTL position sensor 328, the example LE speed sensor 330, the example RE speed sensor 332, the example LGL position sensor 334, the example controller 336, the first example control system 338, the first example memory 340, the second example control system 342, the second example memory 344, the example control relay 346, and/or, more generally, the example shrink control systems 300, 400 of FIGS. 3-5 is/are hereby expressly defined to include a non-transitory computer readable storage device or storage disk such as a memory, a digital versatile disk (DVD), a compact disk (CD), a Blu-ray disk, etc. including the software and/or firmware. Further still, the example shrink control systems 300, 400 of FIGS. 3-5 may include one or more elements, processes and/or devices in addition to, or instead of, those illustrated in FIGS. 3-5, and/or may include more than one of any or all of the illustrated elements, processes and devices.

Figure 6:
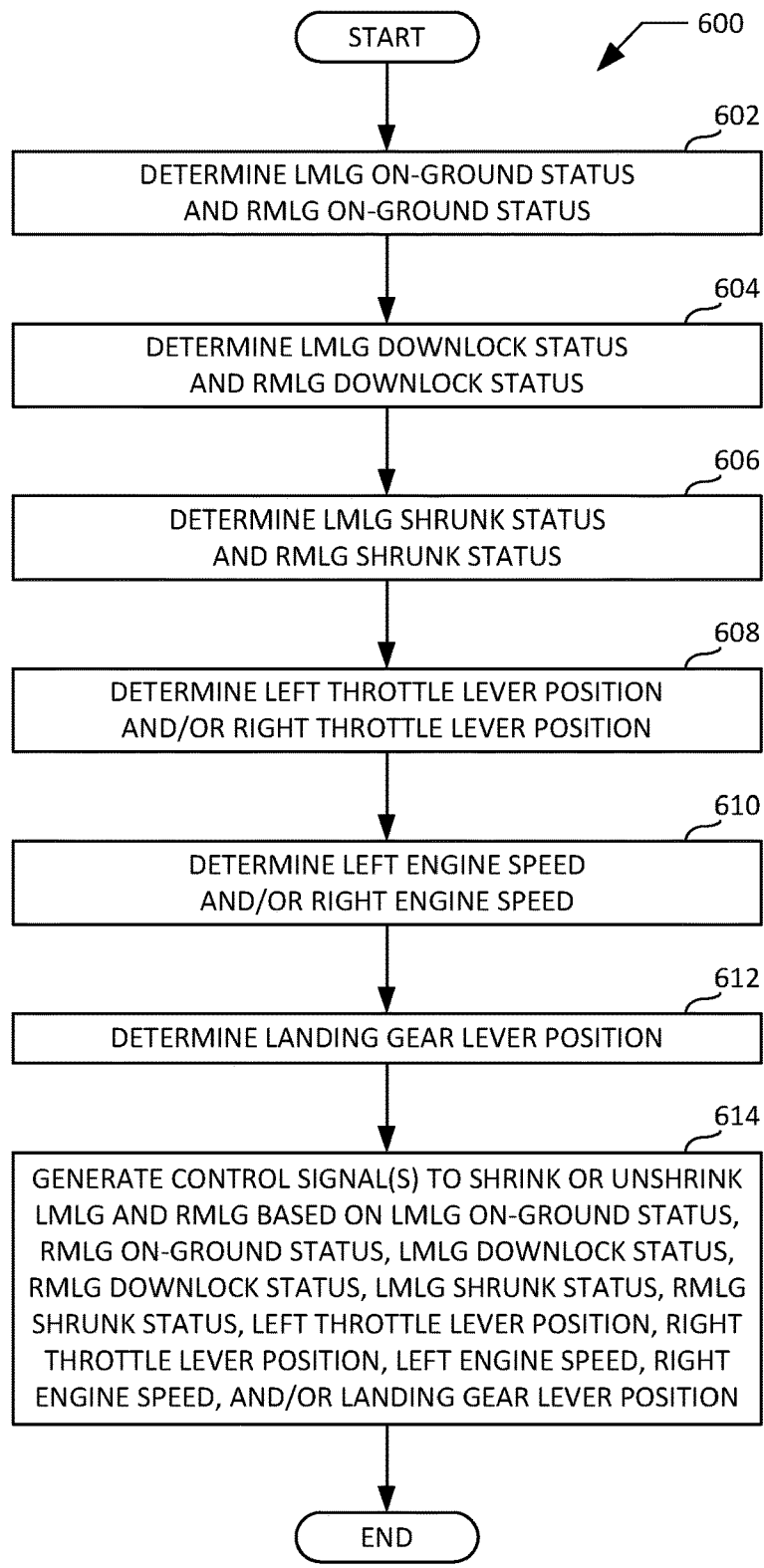
FIG. 6 is a flowchart representative of an example method that may be executed at the example controller of the example shrink control systems of FIGS. 3-5 to control landing gear shrink.

A flowchart representative of an example method for implementing the example shrink control systems 300, 400 of FIGS. 3-5 to control landing gear shrink is shown in FIG. 6. In this example, the method may be implemented using machine-readable instructions that comprise one or more program(s) for execution by one or more processor(s) such as the processor 702 shown in the example processor platform 700 discussed below in connection with FIG. 7. The one or more program(s) may be embodied in software stored on a non-transitory computer readable storage medium such as a CD-ROM, a floppy disk, a hard drive, a digital versatile disk (DVD), a Blu-ray disk, or a memory associated with the processor 702, but the entirety of any program and/or parts thereof could alternatively be executed by a device other than the processor 702, and/or embodied in firmware or dedicated hardware. Further, although the example program(s) is/are described with reference to the flowchart illustrated in FIG. 6, many other methods of implementing the example shrink control systems 300, 400 of FIGS. 3-5 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example method of FIG. 6 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 6 is a flowchart representative of an example method 600 that may be executed at the example controller 336 of the example shrink control systems 300, 400 of FIGS. 3-5 to control landing gear shrink. The example method 600 of FIG. 6 begins when the controller 336 of FIGS. 3 and 4 determines an LMLG on-ground status and an RMLG on-ground status (block 602). For example, the controller 336 may determine the LMLG on-ground status (e.g., whether the first set of wheels 108 of the LMLG 106 of the aircraft 100 of FIG. 1 is in contact with a ground surface) based on the LMLG on-ground status data sensed and/or detected via the first LMLG on-ground sensor 302 and/or the second LMLG on-ground sensor 304 of FIGS. 3 and 4. The controller 336 may determine the RMLG on-ground status (e.g., whether the second set of wheels 112 of the LMLG 106 of the aircraft 100 of FIG. 1 is in contact with a ground surface) based on the RMLG on-ground status data sensed and/or detected via the first RMLG on-ground sensor 306 and/or the second RMLG on-ground sensor 308 of FIGS. 3 and 4. Following block 602, control of the example method 600 of FIG. 6 proceeds to block 604.

At block 604, the controller 336 of FIGS. 3 and 4 determines a LMLG downlock status and a RMLG downlock status (block 604). For example, the controller 336 may determine the LMLG downlock status (e.g., whether the LMLG 106 of the aircraft 100 of FIG. 1 is downlocked) based on the LMLG downlock status data sensed and/or detected via the first LMLG downlock sensor 310 and/or the second LMLG downlock sensor 312 of FIGS. 3 and 4. The controller 336 may determine the RMLG downlock status (e.g., whether the RMLG 110 of the aircraft 100 of FIG. 1 is downlocked) based on the RMLG downlock status data sensed and/or detected via the first RMLG downlock sensor 314 and/or the second RMLG downlock sensor 316 of FIGS. 3 and 4. Following block 604, control of the example method 600 of FIG. 6 proceeds to block 606.

At block 606, the controller 336 of FIGS. 3 and 4 determines a LMLG shrunk status and a RMLG shrunk status (block 606). For example, the controller 336 may determine the LMLG shrunk status (e.g., whether the LMLG 106 of the aircraft 100 of FIG. 1 is shrunk) based on the LMLG shrunk status data sensed and/or detected via the first LMLG shrunk sensor 318 and/or the second LMLG shrunk sensor 320 of FIGS. 3 and 4. The controller 336 may determine the RMLG shrunk status (e.g., whether the RMLG 110 of the aircraft 100 of FIG. 1 is shrunk) based on the RMLG shrunk status data sensed and/or detected via the first RMLG shrunk sensor 322 and/or the second RMLG shrunk sensor 324 of FIGS. 3 and 4. Following block 606, control of the example method 600 of FIG. 6 proceeds to block 608.

At block 608, the controller 336 of FIGS. 3 and 4 determines a left throttle lever position and/or a right throttle lever position (block 608). For example, the controller 336 may determine the throttle lever position of a left throttle lever of the aircraft 100 of FIG. 1 based on the left throttle lever position data sensed and/or detected via the LTL position sensor 326 of FIGS. 3 and 4. The controller 336 may additionally or alternatively determine the throttle lever position of a right throttle lever of the aircraft 100 of FIG. 1 based on the right throttle lever position data sensed and/or detected via the RTL position sensor 328 of FIGS. 3 and 4. In some examples, the controller 336 may determine whether the left throttle lever position and/or the right throttle lever position exceed(s) a throttle lever position threshold. Following block 608, control of the example method 600 of FIG. 6 proceeds to block 610.

At block 610, the controller 336 of FIGS. 3 and 4 determines a left engine speed and/or a right engine speed (block 610). For example, the controller 336 may determine the engine speed of the left engine 118 of the aircraft 100 of FIG. 1 based on the left engine speed data sensed and/or detected via the LE speed sensor 330 of FIGS. 3 and 4. The controller 336 may additionally or alternatively determine the engine speed of the right engine 120 of the aircraft 100 of FIG. 1 based on the right engine speed data sensed and/or detected via the RE speed sensor 332 of FIGS. 3 and 4. In some examples, the controller 336 may determine whether the left engine speed and/or the right engine speed exceed(s) an engine speed threshold. Following block 610, control of the example method 600 of FIG. 6 proceeds to block 612.

At block 612, the controller 336 of FIGS. 3 and 4 determines a landing gear lever position (block 612). For example, the controller 336 may determine the landing gear lever position of a landing gear lever of the aircraft 100 of FIG. 1 based on the landing gear lever position data sensed and/or detected via the LGL position sensor 334 of FIGS. 3 and 4. In some examples, the controller 336 may determine whether the landing gear of the aircraft 100 of FIG. 1 is positioned in an up position or is instead positioned in a down position. Following block 612, control of the example method 600 of FIG. 6 proceeds to block 614.

At block 614, the controller 336 of FIGS. 3 and 4 generates one or more control signal(s) to either shrink or unshrink the LMLG 106 and the RMLG 110 of FIG. 1 based on the LMLG on-ground status, the RMLG on-ground status, the LMLG downlock status, the RMLG downlock status, the LMLG shrunk status, the RMLG shrunk status, the left throttle lever position, the right throttle lever position, the left engine speed, the right engine speed, and/or the landing gear lever position (block 606). For example, the controller 336 may execute and/or otherwise implement the example control logic diagram 500 of FIG. 5 described above to generate one or more control signal(s) to either shrink or unshrink the LMLG 106 and the RMLG 110 of FIG. 1. Following block 614, the example method 600 of FIG. 6 ends.

Figure 7:
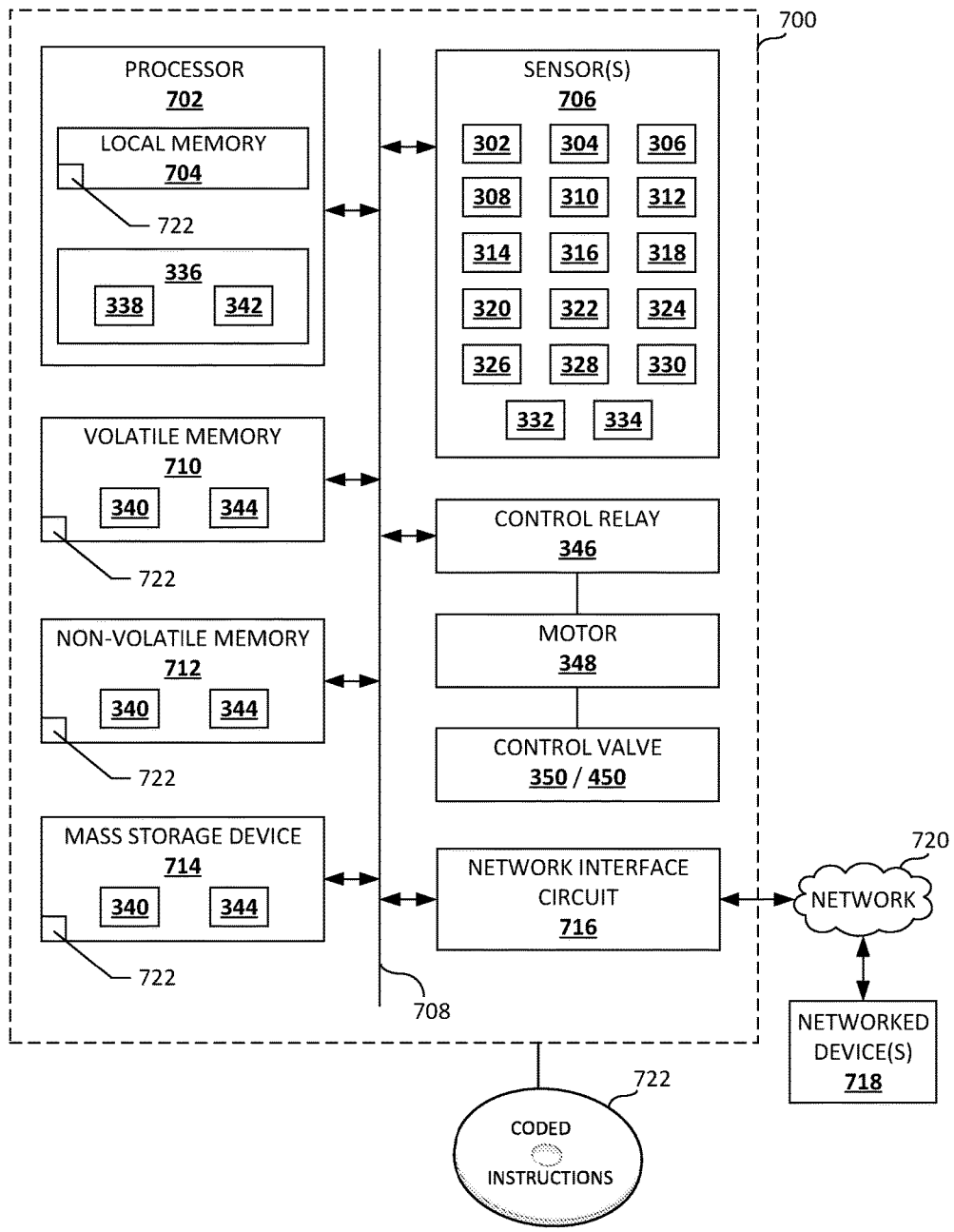
FIG. 7 is a block diagram of an example processor platform capable of executing instructions to implement the example method of FIG. 6 and the example shrink control systems of FIGS. 3-5.

FIG. 7 is a block diagram of an example processor platform 700 capable of executing instructions to implement the example method 600 of FIG. 6, and the example shrink control systems 300, 400 of FIGS. 3-5. The processor platform 700 of the illustrated example includes a processor 702. The processor 702 of the illustrated example is hardware. For example, the processor 702 can be implemented by one or more integrated circuit(s), logic circuit(s), microprocessor(s) or controller(s) from any desired family or manufacturer. In the example of FIG. 7, the processor 702 implements the example controller 336, the first example control system 338, and the second example control system 342 of FIGS. 3 and 4. The processor 702 of the illustrated example also includes a local memory 704 (e.g., a cache).

The processor 702 of the illustrated example is in communication with one or more sensor(s) 706 via a bus 708 (e.g., a CAN bus). In the example of FIG. 7, the sensor(s) 706 include the first example LMLG on-ground sensor 302, the second example LMLG on-ground sensor 304, the first example RMLG on-ground sensor 306, the second example RMLG on-ground sensor 308, the first example LMLG downlock sensor 310, the second example LMLG downlock sensor 312, the first example RMLG downlock sensor 314, the second example RMLG downlock sensor 316, the first example LMLG shrunk sensor 318, the second example LMLG shrunk sensor 320, the first example RMLG shrunk sensor 322, the second example RMLG shrunk sensor 324, the example LTL position sensor 326, the example RTL position sensor 328, the example LE speed sensor 330, the example RE speed sensor 332, and the example LGL position sensor 334 of FIGS. 3 and 4.

The processor 702 of the illustrated example is also in communication with the example control relay 346 of FIGS. 3 and 4 via the bus 708. In the example of FIG. 7, the example motor 348 of FIGS. 3 and 4 is operatively coupled to the control relay 346, and the example three-way control valve 350 of FIG. 3 or the example four-way control valve 450 of FIG. 4 is operatively coupled to the motor 348.

The processor 702 of the illustrated example is also in communication with a main memory including a volatile memory 710 and a non-volatile memory 712 via the bus 708. The volatile memory 710 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 712 may be implemented by flash memory and/or any other desired type of memory device. Access to the volatile memory 710 and the non-volatile memory 712 is controlled by a memory controller. In the illustrated example, the main memory 710, 712 includes the first example memory 340 and the second example memory 344 of FIGS. 3 and 4.

The processor 702 of the illustrated example is also in communication with a mass storage device 714 for storing software and/or data. The mass storage device 714 may be implemented, for example, via one or more floppy disk drives, hard drive disks, compact disk drives, Blu-ray disk drives, RAID systems, digital versatile disk (DVD) drives, etc. In the illustrated example, the mass storage device 714 includes the first example memory 340 and the second example memory 344 of FIGS. 3 and 4.

The processor platform 700 of the illustrated example also includes a network interface circuit 716. The network interface circuit 716 may be implemented by any type of interface standard, such as an Ethernet interface, a universal serial bus (USB), and/or a PCI express interface. The network interface circuit 716 of the illustrated example includes a communication device such as a transmitter, a receiver, a transceiver, a modem and/or network interface card to facilitate exchange of data with one or more networked device(s) 718 (e.g., computing and/or controller devices of any kind) via a network 720 (e.g., a controller area network, a wireless network, a cellular network, etc.).

Coded instructions 722 for implementing the example method 600 of FIG. 6 may be stored in the local memory 704, in the volatile memory 710, in the non-volatile memory 712, on the mass storage device 714, and/or on a removable tangible computer readable storage medium such as a CD or DVD.

From the foregoing, it will be appreciated that the disclosed methods and apparatus advantageously provide for automated control of the shrinking and/or unshrinking of landing gear (e.g., the LMLG 106 and/or the RMLG 110 of the aircraft 100 of FIG. 1). Automating the shrinking and/or unshrinking of the LMLG 106 and/or the RMLG 110 simplifies the overall process of retracting and/or deploying the LMLG 106 and/or the RMLG 110, and advantageously reduces the amount of time that may otherwise be consumed conducting the entirety of the retraction and/or deployment processes. For example, in response to determining that certain takeoff criteria associated with the aircraft 100 of FIG. 1 have been satisfied, the disclosed shrink control systems may automatically shrink the LMLG 106 and the RMLG 110 of FIG. 1 at a time prior to the landing gear lever of the aircraft 100 of FIG. 1 being manually actuated into the up position. Based on such automated shrinking, aircraft implementing the disclosed shrink control systems may carry greater payload in connection with obstacle-impeded takeoffs, as may occur in association with runways that are surrounded by trees, walls, and/or other vertically-projecting structures to be cleared by the aircraft during takeoff.

In some examples, an apparatus is disclosed. In some disclosed examples, the apparatus comprises a controller. In some disclosed examples, the controller is to determine an on-ground status of a left main landing gear. In some disclosed examples, the controller is to determine an on-ground status of a right main landing gear. In some disclosed examples, the controller is to generate a control signal to shrink the left main landing gear and the right main landing gear based on the on-ground status of the left main landing gear and the on-ground status of the right main landing gear.

In some disclosed examples, the controller is to generate the control signal in response to the on-ground status of the left main landing gear indicating that a first set of wheels of the left main landing gear is not contacting a ground surface, and further in response to the on-ground status of the right main landing gear indicating that a second set of wheels of the right main landing gear is not contacting a ground surface.

In some disclosed examples, the controller is to determine an engine speed of at least one of a left engine or a right engine. In some disclosed examples, the controller is to generate the control signal to shrink the left main landing gear and the right main landing gear based further on the engine speed of the at least one of the left engine or the right engine. In some disclosed examples, the controller is to generate the control signal in response to determining that the engine speed of the at least one of the left engine or the right engine exceeds an engine speed threshold.

In some disclosed examples, the controller is to determine a throttle parameter of at least one of a left throttle or a right throttle. In some disclosed examples, the controller is to generate the control signal to shrink the left main landing gear and the right main landing gear based further on the throttle parameter of the at least one of the left throttle or the right throttle. In some disclosed examples, the controller is to generate the control signal in response to determining that the throttle parameter of the at least one of the left throttle or the right throttle exceeds a throttle parameter threshold.

In some disclosed examples, the controller is to determine a downlock status of the left main landing gear. In some disclosed examples, the controller is to determine a downlock status of the right main landing gear. In some disclosed examples, the controller is to generate the control signal to shrink the left main landing gear and the right main landing gear based further on the downlock status of the left main landing gear and the downlock status of the right main landing gear. In some disclosed examples, the controller is to generate the control signal in response to at least one of the downlock status of the left main landing gear or the downlock status of the right main landing gear indicating that the left main landing gear or the right main landing gear is not downlocked.

In some disclosed examples, the controller is to determine a landing gear position parameter. In some disclosed examples, the controller is to generate the control signal to shrink the left main landing gear and the right main landing gear based further on the landing gear position parameter. In some disclosed examples, the controller is to generate the control signal in response to determining that the landing gear position parameter corresponds to an up position.

In some examples, a method is disclosed. In some disclosed examples, the method comprises determining, by executing one or more instructions via a controller, an on-ground status of a left main landing gear. In some disclosed examples, the method comprises determining, by executing one or more instructions via the controller, an on-ground status of a right main landing gear. In some disclosed examples, the method comprises generating, by executing one or more instructions via the controller, a control signal to shrink the left main landing gear and the right main landing gear based on the on-ground status of the left main landing gear and the on-ground status of the right main landing gear.

In some disclosed examples of the method, the generating of the control signal is in response to the on-ground status of the left main landing gear indicating that a first set of wheels of the left main landing gear is not contacting a ground surface, and further in response to the on-ground status of the right main landing gear indicating that a second set of wheels of the right main landing gear is not contacting a ground surface.

In some disclosed examples, the method further comprises determining, by executing one or more instructions via the controller, an engine speed of at least one of a left engine or a right engine. In some disclosed examples, the method further comprises generating the control signal to shrink the left main landing gear and the right main landing gear based further on the engine speed of the at least one of the left engine or the right engine.

In some disclosed examples, the method further comprises determining, by executing one or more instructions via the controller, a throttle parameter of at least one of a left throttle or a right throttle. In some disclosed examples, the method further comprises generating the control signal to shrink the left main landing gear and the right main landing gear based further on the throttle parameter of the at least one of the left throttle or the right throttle.

In some disclosed examples, the method further comprises determining, by executing one or more instructions via the controller, a downlock status of the left main landing gear. In some disclosed examples, the method further comprises determining, by executing one or more instructions via the controller, a downlock status of the right main landing gear. In some disclosed examples, the method further comprises generating the control signal to shrink the left main landing gear and the right main landing gear based further on the downlock status of the left main landing gear and the downlock status of the right main landing gear.

In some examples, a non-transitory machine-readable storage medium comprising instructions is disclosed. In some disclosed examples, the instructions, when executed, cause a controller to determine an on-ground status of a left main landing gear. In some disclosed examples, the instructions, when executed, cause the controller to determine an on-ground status of a right main landing gear. In some disclosed examples, the instructions, when executed, cause the controller to generate a control signal to shrink the left main landing gear and the right main landing gear based on the on-ground status of the left main landing gear and the on-ground status of the right main landing gear.

In some disclosed examples, the instructions, when executed, cause the controller to generate the control signal in response to the on-ground status of the left main landing gear indicating that a first set of wheels of the left main landing gear is not contacting a ground surface, and further in response to the on-ground status of the right main landing gear indicating that a second set of wheels of the right main landing gear is not contacting a ground surface.

In some disclosed examples, the instructions, when executed, further cause the controller to determine an engine speed of at least one of a left engine or a right engine. In some disclosed examples, the instructions, when executed, cause the controller to generate the control signal to shrink the left main landing gear and the right main landing gear based further on the engine speed of the at least one of the left engine or the right engine.

In some disclosed examples, the instructions, when executed, further cause the controller to determine a throttle parameter of at least one of a left throttle or a right throttle. In some disclosed examples, the instructions, when executed, cause the controller to generate the control signal to shrink the left main landing gear and the right main landing gear based further on the throttle parameter of the at least one of the left throttle or the right throttle.

In some disclosed examples, the instructions, when executed, further cause the controller to determine a downlock status of the left main landing gear. In some disclosed examples, the instructions, when executed, further cause the controller to determine a downlock status of the right main landing gear. In some disclosed examples, the instructions, when executed, cause the controller to generate the control signal to shrink the left main landing gear and the right main landing gear based further on the downlock status of the left main landing gear and the downlock status of the right main landing gear.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a controller to:
     determine an on-ground status of a left main landing gear;
     determine an on-ground status of a right main landing gear; and
     generate a control signal to shrink the left main landing gear and the right main landing gear in response to the on-ground status of the left main landing gear indicating that a first set of wheels of the left main landing gear is not contacting a ground surface, and further in response to the on-ground status of the right main landing gear indicating that a second set of wheels of the right main landing gear is not contacting the ground surface.

2. The apparatus of claim 1, wherein the controller is to:
   determine an engine speed of at least one of a left engine or a right engine; and
   generate the control signal to shrink the left main landing gear and the right main landing gear based further on the engine speed of the at least one of the left engine or the right engine.

3. The apparatus of claim 2, wherein the controller is to generate the control signal in response to determining that the engine speed of the at least one of the left engine or the right engine exceeds an engine speed threshold.

4. The apparatus of claim 1, wherein the controller is to:
   determine a throttle parameter of at least one of a left throttle or a right throttle; and
   generate the control signal to shrink the left main landing gear and the right main landing gear based further on the throttle parameter of the at least one of the left throttle or the right throttle.

5. The apparatus of claim 4, wherein the controller is to generate the control signal in response to determining that the throttle parameter of the at least one of the left throttle or the right throttle exceeds a throttle parameter threshold.

6. The apparatus of claim 1, wherein the controller is to:
   determine a downlock status of the left main landing gear;
   determine a downlock status of the right main landing gear; and
   generate the control signal to shrink the left main landing gear and the right main landing gear based further on the downlock status of the left main landing gear and the downlock status of the right main landing gear.

7. The apparatus of claim 6, wherein the controller is to generate the control signal in response to at least one of the downlock status of the left main landing gear or the downlock status of the right main landing gear indicating that the left main landing gear or the right main landing gear is not downlocked.

8. The apparatus of claim 1, wherein the controller is to:
   determine a landing gear position parameter; and
   generate the control signal to shrink the left main landing gear and the right main landing gear based further on the landing gear position parameter.

9. The apparatus of claim 8, wherein the controller is to generate the control signal in response to determining that the landing gear position parameter corresponds to an up position.

10. The apparatus of claim 1, wherein the ground surface is a runway.

11. A method comprising:
    determining, by executing one or more instructions via a controller, an on-ground status of a left main landing gear;
    determining, by executing one or more instructions via the controller, an on-ground status of a right main landing gear; and
    generating, by executing one or more instructions via the controller, a control signal to shrink the left main landing gear and the right main landing gear in response to the on-ground status of the left main landing gear indicating that a first set of wheels of the left main landing gear is not contacting a ground surface, and further in response to the on-ground status of the right main landing gear indicating that a second set of wheels of the right main landing gear is not contacting the ground surface.

12. The method of claim 11, further comprising:
- determining, by executing one or more instructions via the controller, an engine speed of at least one of a left engine or a right engine; and
- generating the control signal to shrink the left main landing gear and the right main landing gear based further on the engine speed of the at least one of the left engine or the right engine.

13. The method of claim 11, further comprising:
- determining, by executing one or more instructions via the controller, a throttle parameter of at least one of a left throttle or a right throttle; and
- generating the control signal to shrink the left main landing gear and the right main landing gear based further on the throttle parameter of the at least one of the left throttle or the right throttle.

14. The method of claim 11, further comprising:
- determining, by executing one or more instructions via the controller, a downlock status of the left main landing gear;
- determining, by executing one or more instructions via the controller, a downlock status of the right main landing gear; and
- generating the control signal to shrink the left main landing gear and the right main landing gear based further on the downlock status of the left main landing gear and the downlock status of the right main landing gear.

15. The method of claim 11, further comprising:
- determining, by executing one or more instructions via the controller, a landing gear position parameter; and
- generating the control signal to shrink the left main landing gear and the right main landing gear based further on the landing gear position parameter.

16. A non-transitory machine-readable storage medium comprising instructions that, when executed, cause a controller to at least:
- determine an on-ground status of a left main landing gear;
- determine an on-ground status of a right main landing gear; and
- generate a control signal to shrink the left main landing gear and the right main landing gear in response to the on-ground status of the left main landing gear indicating that a first set of wheels of the left main landing gear is not contacting a ground surface, and further in response to the on-ground status of the right main landing gear indicating that a second set of wheels of the right main landing gear is not contacting the ground surface.

17. The non-transitory machine-readable storage medium of claim 16, wherein the instructions, when executed, cause the controller to:
- determine an engine speed of at least one of a left engine or a right engine; and
- generate the control signal to shrink the left main landing gear and the right main landing gear based further on the engine speed of the at least one of the left engine or the right engine.

18. The non-transitory machine-readable storage medium of claim 16, wherein the instructions, when executed, cause the controller to:
- determine a throttle parameter of at least one of a left throttle or a right throttle; and
- generate the control signal to shrink the left main landing gear and the right main landing gear based further on the throttle parameter of the at least one of the left throttle or the right throttle.

19. The non-transitory machine-readable storage medium of claim 16, wherein the instructions, when executed, cause the controller to:
- determine a downlock status of the left main landing gear;
- determine a downlock status of the right main landing gear; and
- generate the control signal to shrink the left main landing gear and the right main landing gear based further on the downlock status of the left main landing gear and the downlock status of the right main landing gear.

20. The non-transitory machine-readable storage medium of claim 16, wherein the instructions, when executed, cause the controller to:
- determine a landing gear position parameter; and
- generate the control signal to shrink the left main landing gear and the right main landing gear based further on the landing gear position parameter.

* * * * *